US010053606B2

(12) United States Patent
Virnelson et al.

(10) Patent No.: US 10,053,606 B2
(45) Date of Patent: Aug. 21, 2018

(54) NON-CHROMATE CORROSION INHIBITING POLYTHIOETHER SEALANTS

(71) Applicant: PRC-DeSoto International, Inc., Sylmar, CA (US)

(72) Inventors: Bruce Virnelson, Valencia, CA (US); Adam Stott, Glendale, CA (US); Sean Manion, Los Angeles, CA (US); Brian Bertino, Glendale, CA (US); Nagarajan Srivatsan, Diamond Bar, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 224 days.

(21) Appl. No.: 14/922,316

(22) Filed: Oct. 26, 2015

(65) Prior Publication Data

US 2017/0114259 A1   Apr. 27, 2017

(51) Int. Cl.
| | | |
|---|---|---|
| *C09K 3/10* | (2006.01) |
| *C23F 11/18* | (2006.01) |
| *C08J 7/00* | (2006.01) |
| *C08G 65/32* | (2006.01) |
| *C08G 75/00* | (2006.01) |
| *C08G 75/04* | (2016.01) |
| *C08L 81/00* | (2006.01) |

(52) U.S. Cl.
CPC ............ *C09K 3/1012* (2013.01); *C08G 65/32* (2013.01); *C08G 75/00* (2013.01); *C08G 75/04* (2013.01); *C08J 7/00* (2013.01); *C08L 81/00* (2013.01); *C23F 11/188* (2013.01)

(58) Field of Classification Search
CPC .................................................. C09K 3/1012
See application file for complete search history.

(56) References Cited

U.S. PATENT DOCUMENTS

| | | | |
|---|---|---|---|
| 4,366,307 A | 12/1982 | Singh et al. | |
| 4,609,762 A | 9/1986 | Morris et al. | |
| 5,077,096 A | 12/1991 | Sharaby | |
| 5,225,472 A | 7/1993 | Cameron et al. | |
| 5,270,364 A | 12/1993 | Schwartz et al. | |
| 5,284,888 A | 2/1994 | Morgan | |
| 5,665,149 A * | 9/1997 | Gotzmann | ............ C09C 1/0081 106/14.05 |
| 5,917,747 A | 6/1999 | Koops et al. | |
| 5,951,747 A | 9/1999 | Lewis et al. | |
| 6,059,867 A | 5/2000 | Lewis et al. | |
| 6,172,179 B1 | 1/2001 | Zook et al. | |
| 6,525,168 B2 | 2/2003 | Zook et al. | |
| 7,671,145 B2 | 3/2010 | Sawant et al. | |
| 8,513,339 B1 | 8/2013 | Keledjian et al. | |
| 8,541,513 B2 | 9/2013 | Hobbs et al. | |
| 8,710,159 B2 | 4/2014 | Blackford et al. | |
| 8,952,124 B2 | 2/2015 | Rao et al. | |
| 9,056,949 B2 | 6/2015 | Cai et al. | |
| 2006/0270796 A1 | 11/2006 | Sawant et al. | |
| 2007/0287810 A1 | 12/2007 | Rao et al. | |
| 2008/0224098 A1 | 9/2008 | Tang et al. | |
| 2009/0326167 A1 | 12/2009 | Sawant et al. | |
| 2010/0010133 A1 | 1/2010 | Zook et al. | |
| 2010/0041839 A1 | 2/2010 | Anderson et al. | |
| 2013/0345372 A1* | 12/2013 | Blackford | ............ C07D 303/22 525/535 |
| 2014/0051789 A1 | 2/2014 | Rao et al. | |

FOREIGN PATENT DOCUMENTS

| | | |
|---|---|---|
| WO | WO 99/24491 | 5/1999 |
| WO | 2009/023690 A1 | 2/2009 |

* cited by examiner

Primary Examiner — Peter F Godenschwager
(74) Attorney, Agent, or Firm — William R. Lambert

(57) ABSTRACT

Compositions comprising thiol-terminated polythioether prepolymers, polyepoxides and non-chromate corrosion inhibitors suitable for use in aerospace sealant applications are disclosed. Sealants prepared using the compositions adhere to a variety of aerospace substrates following exposure to aerospace fluids.

33 Claims, No Drawings

NON-CHROMATE CORROSION INHIBITING POLYTHIOETHER SEALANTS

FIELD

The present disclosure relates to non-chromate corrosion inhibiting polythioether sealants. The sealant compositions are based on a thiol-epoxy, amine-cured chemistry and contain a non-chromate corrosion inhibitor. The compositions are useful in aerospace sealant applications.

BACKGROUND

Aerospace sealants must satisfy demanding mechanical, chemical, and environmental requirements. Aerospace sealants can be applied to a variety of surfaces including metal surfaces, primer coatings, intermediate coatings, finished coatings, and aged coatings. Sealants comprising sulfur-containing prepolymers that exhibit acceptable fuel resistance, thermal resistance, and flexibility for aerospace applications are described, for example, in U.S. Pat. No. 6,172,179. In sealants such as those described in U.S. Application Publication Nos. 2006/0270796, 2007/0287810, and 2009/0326167, a sulfur-containing prepolymer such as a thiol-terminated polythioether prepolymer can be reacted with a polyepoxide curing agent in the presence of an amine catalyst to provide a cured product. These systems are useful as sealants and can meet the demanding performance requirements of the aerospace industry.

To impart corrosion resistance, a chromate such as hexavalent chromium (chromium (VI)) compounds or strontium chromate ($SrCrO_4$) can be added to a sealant composition. Although chromates can provide excellent corrosion resistance to aluminum surfaces, the heavy metals are toxic. It is therefore highly desirable to develop alternative non-chromate corrosion inhibitors for use in aerospace sealant applications.

Corrosion inhibiting sealants should provide the following functions: (1) rapid polymer exit and short term metal passivation; (2) passivation by metal surface adsorption and double layer space charge altering; (3) forming a water insoluble passivation layer which persists or remains insoluble in neutral, alkaline, and acidic environments; (4) passivation by control of pH or neutralization of acid at the metal/electrolyte interface; and (5) transport out of the polymeric matrix onto adjacent exposed bare metal areas in a moist but no liquid immersed environment.

Examples of non-chromate corrosion inhibitors are disclosed in U.S. Pat. No. 5,951,747 and in U.S. Pat. No. 6,059,867, each of which is incorporated by reference in its entirety.

U.S. Pat. No. 5,917,747 discloses non-chromate corrosion inhibitors for epoxy/polythioether-based sealant compositions comprising at least one inhibitor selected from a phosphate, a phosphosilicate, and a silicate, and at least one inhibitor selected from a titanate and a zinc salt. More particularly, a non-chromate corrosion inhibitor can comprise a borate such as boric acid, a sulfur-containing succinate such as (2-benzothiazolylthio)succinic acid or an amine salt thereof, a phosphate such as calcium dihydrogen phosphate, a phosphosilicate such as calcium, strontium zinc phosphosilicate, a titanate such as sodium titanium oxide, and a zinc salt such as zinc phosphate and/or zinc cyanamide U.S. Pat. No. 5,917,747 does not disclose any properties of a cured sealant important to aerospace sealant applications such as adhesion, tensile strength, elongation, and fuel resistance.

U.S. Pat. No. 6,059,867 discloses non-chromate corrosion inhibitors comprising at least one compound selected from boric acid and boric acid salts, dipotassium monohydrogen phosphate, calcium dihydrogen phosphate, ammonium dihydrogen phosphate, sodium dihydrogen phosphate, potassium dihydrogen phosphate, sodium pyrophosphate, calcium strontium phosphosilicate, calcium, strontium zinc phosphosilicate, and tetra sodium orthosilicate; and (b) at least one compound selected from sodium titanium oxide, an inorganic zinc compound such as zinc borate, and an organo-zinc compound. Specific inhibitor combinations evaluated include one or more of boric acid, calcium dihydrogen phosphate, dipotassium monohydrogen phosphate, sodium pyrophosphate, calcium, strontium phosphosilicate or calcium strontium zinc phosphosilicate, tetrasodium orthosilicate, (2-benzothiazolylthio)succinic acid, sodium titanium oxide, zinc phosphate, and zinc cyanamide. The formulations were only evaluated for galvanic current, electrochemical impedance, filiform testing, salt spray testing, and pH range immersion testing.

However, non-chromate corrosion inhibitor packages for use with polyepoxide-cured thiol-terminated polythioether sealants have not been developed or demonstrated to be effective as aerospace sealants.

SUMMARY

It is desirable to provide non-chromate corrosion inhibiting, polyepoxide-cured polythioether aerospace sealants.

According to the present invention, compositions can comprise a thiol-terminated polythioether prepolymer, a polyepoxide curing agent, and a non-chromate corrosion inhibitor.

According to the present invention, cured sealants prepared from the inventive compositions can comprise a thiol-terminated polythioether prepolymer, a polyepoxide curing agent, and a non-chromate corrosion inhibitor are provided.

According to the present invention, methods of sealing a part can comprise providing compositions comprising a thiol-terminated polythioether prepolymer, a polyepoxide curing agent, and a non-chromate corrosion inhibitor; applying the composition to at least a portion of a surface of a part; and curing the applied composition to provide a sealed part.

According to the present invention, sealant systems can comprise a first part comprising a thiol-terminated polythioether prepolymer; and a first portion of a non-chromate corrosion inhibitor; and a second part comprising a polyepoxide; and a second portion of a non-chromate corrosion inhibitor.

According to the present invention, curable sealant compositions formed by combining the first part and the second part of a sealant system of the present disclosure are provided.

According to the present invention, non-chromate corrosion inhibitors can comprise from 2 wt % to 6 wt % of zinc borate; from 1 wt % to 5 wt % of 2-benzothiazolylthiobutanedioic acid; from 35 wt % to 70 wt % of zinc orthophosphate; from 20 wt % to 50 wt % of sodium titanate; and from 3 wt % to 8 wt % of tricalcium phosphate, wherein wt % is based on the total weight of the non-chromate corrosion inhibitor.

Reference is now made to certain compositions, sealants, and methods of the present invention. The disclosed compositions, sealants, and methods are not intended to be limiting of the claims. To the contrary, the claims are intended to cover all alternatives, modifications, and equivalents.

DETAILED DESCRIPTION

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

A dash ("-") that is not between two letters or symbols is used to indicate a point of bonding for a substituent or between two atoms. For example, —$CONH_2$ is bonded to another chemical moiety through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. Each aryl and/or arenediyl group(s) can be $C_{6-12}$, $C_{6-10}$, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, or $C_{6-9}$ alkanearene. Examples of alkanearene groups include diphenyl methane.

"Alkanearenediyl" refers to a diradical of an alkanearene group. An alkanearenediyl group is $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, or $C_{6-9}$ alkanearenediyl. Examples of alkanearenediyl groups include diphenyl methane-4,4'-diyl.

"Alkenyl" group refers to a group $(R)_2C=C(R)_2$. An alkenyl group has the structure —$C(R)=C(R)_2$ where the alkenyl group is a terminal group and is bonded to a larger molecule. In such embodiments, each R may be selected from, for example, hydrogen and $C_{1-3}$ alkyl. Each R can be hydrogen and an alkenyl group can have the structure —$CH=CH_2$.

"Alkoxy" refers to a —OR group where R is alkyl as defined herein. Examples of alkoxy groups include methoxy, ethoxy, n-propoxy, isopropoxy, and n-butoxy. An alkoxy group can be $C_{1-8}$ alkoxy, $C_{1-6}$ alkoxy, $C_{1-4}$ alkoxy, or $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{2-6}$ alkyl, $C_{2-4}$ alkyl, or $C_{2-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group can be $C_{2-6}$ alkyl, $C_{2-4}$ alkyl, or $C_{2-3}$ alkyl. It will be appreciated that a branched alkyl has at least three carbon atoms.

"Arenediyl" refers to diradical monocyclic or polycyclic aromatic group. Examples of arenediyl groups include benzene-diyl and naphthalene-diyl. An arenediyl group can be $C_{6-12}$ arenediyl, $C_{6-10}$ arenediyl, $C_{6-9}$ arenediyl, or benzenediyl.

A "curable composition" refers to a composition that comprises at least two reactants capable of reacting to form a cured composition. For example, a curable composition can comprise a thiol-terminated polythioether prepolymer and a polyepoxide capable of reacting to form a cured polymer network. A curable composition may include a catalyst for the curing reaction and other components such as, for example, fillers, pigments, and adhesion promoters. A curable composition may be curable at ambient conditions such as room temperature and humidity, or may require exposure to elevated temperature, moisture, or other condition(s) to initiate and/or accelerate the curing reaction. A curable composition may initially be provided as a two part composition including a base component and an accelerator component. The base composition can contain one of the reactants participating in the curing reaction such as a thiol-terminated polythioether prepolymer and the accelerator composition can contain the other reactant such as a polyepoxide. The two compositions can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise. A Class B sealant composition, which is suitable for fillet seal applications, can be characterized by a viscosity from 4,500 poise to 20,000 poise. A Class C sealant composition, which is suitable for fay seal applications, can be characterized by a viscosity from 500 poise to 4,500 poise. After the two components of a sealant system are combined and mixed, the curing reaction can proceed and the viscosity of the curable composition can increase and at some point will no longer be workable. The period of time between when the two components are mixed to form the curable composition and when the curable composition can no longer be reasonably or practically applied to a surface for its intended purpose can be referred to as the working time. As can be appreciated, the working time can depend on a number of factors including, for example, the curing chemistry, the application method, and the temperature. The working time can also be referred to as the pot life. Once a curable composition is applied to a surface (and during application), the curing reaction can proceed to provide a cured composition. A cured composition develops a tack-free surfaces and fully cures over a period of time. A curable composition can be considered to be cured when the surface is tack-free, or can be considered cured, for example, when the Shore A hardness of the surface is 25 A for a Class C sealant and 30 A for a Class B sealant.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl and cyclohexane-1,2-diyl.

"Cycloalkyl" refers to a saturated monocyclic or polycyclic hydrocarbon monoradical group. A cycloalkyl group can be $C_{3-12}$ cycloalkyl, $C_{3-8}$ cycloalkyl, $C_{3-6}$ cycloalkyl, or $C_{5-6}$ cycloalkyl.

"Heteroalkanediyl" refers to an alkanediyl group in which one or more of the carbon atoms are replaced with a heteroatom, such as N, O, S, or P. In a heteroalkanediyl, the one or more heteroatoms can be selected from N and O.

"Heterocycloalkanediyl" refers to a cycloalkanediyl group in which one or more of the carbon atoms are replaced with a heteroatom, such as N, O, S, or P. In a heterocycloalkanediyl, the one or more heteroatoms can be selected from N and O.

"Heteroarenediyl" refers to an arenediyl group in which one or more of the carbon atoms are replaced with a heteroatom, such as N, O, S, or P. In a heteroarenediyl, the one or more heteroatoms can be selected from N and O.

"Heterocycloalkanediyl" refers to a cycloalkanediyl group in which one or more of the carbon atoms are replaced with a heteroatom, such as N, O, S, or P. In a heterocycloalkanediyl, the one or more heteroatoms can be selected from N and O.

As used herein, "polymer" refers to oligomers, homopolymers, and copolymers. Unless stated otherwise, molecular weights are number average molecular weights for polymeric materials indicated as "Mn" as determined, for example, by gel permeation chromatography using a polystyrene standard in an art-recognized manner. A polymer also includes a prepolymer. A prepolymer such as a thiol-terminated polythioether prepolymer provided by the present disclosure can be combined with a curing agent to provide a curable composition, which can cure to provide a cured polymer network.

"Substituted" refers to a group in which one or more hydrogen atoms are each independently replaced with the same or different substituent(s). A substituent can be selected from halogen, $-S(O)_2OH$, $-S(O)_2$, $-SH$, $-SR$ where R is $C_{1-6}$ alkyl, $-COOH$, $-NO_2$, $-NR_2$ where each R is independently selected from hydrogen and $C_{1-3}$ alkyl, $-CN$, $=O$, $C_{1-6}$ alkyl, $-CF_3$, $-OH$, phenyl, $C_{2-6}$ heteroalkyl, $C_{5-6}$ heteroaryl, $C_{1-6}$ alkoxy, and $-COR$ where R is $C_{1-6}$ alkyl. A substituent can be chosen from $-OH$, $-NH_2$, and $C_{1-3}$ alkyl.

Compositions

Compositions provided by the present disclosure can comprise a non-chromate corrosion inhibitor, a thiol-terminated polythioether prepolymer, and a polyepoxide curing agent.

For aerospace sealant applications it is desirable that a non-chromate corrosion inhibiting sealant prevent or reduce corrosion of an underlying substrate surface following exposure to the ambient environment and aerospace solvents and fluids. For example, aerospace sealant applications can require a sealant provide good adhesion to wide variety of substrates following exposure to aerospace solvents at high temperature. For example, aerospace substrates include Alodine® aluminum (MIL-C-5541), anodized aluminum (AMS 2471), cadmium-plated steel (QQ-P-416 (AMS 4130)), titanium (AMS 4911), magnesium (AMS 4376), epoxy primer (MIL-PRF-23377), and graphite-epoxy (AS4/3501-6). The specifications identifying the substrate surfaces refer to Military Specifications (MIL-C), Military Performance Specification (MIL-PRF), or Society of Automotive Engineers (SAE) Aerospace Material Standard (AMS). Examples of relevant aerospace solvents include Jet Reference Fluid (JRF) Type I (AMS 2629), salt (3% NaCl) water, aircraft hydraulic fluid (MIL-PRF-83282), and aircraft lubricating oil (MIL-PRF-7808 and MIL-PRF-23699). The test specifications generally require that a sealant exhibit a peel strength of at least 20 pli and 100% cohesive failure following immersion of the substrate with applied cured sealant in the solvent for 2 days (48 hours) at a temperature of 140° F. (60° C.).

The ability of a sealant to provide corrosion resistance can be determined by measuring, for example, the adhesion between the cured sealant and the substrate following exposure to various accelerated test conditions involving solvent immersion at high temperature. Adhesion can be determined by measuring peel strength and percent (%) cohesion using a suitable test specimen. A sealant applied onto an aerospace substrate that exhibits a peel strength of at least 20 psi and 100% cohesive failure following exposure to accelerated test conditions can be considered to be appropriate for aerospace applications.

Non-Chromate Corrosion Inhibitor

Compositions provided by the present disclosure can contain a non-chromate corrosion inhibitor.

Non-chromate corrosion inhibitors provided by the present disclosure can comprise zinc borate, 2-benzothiazolyl-thiobutanedioic acid, zinc orthophosphate, sodium titanate, and tricalcium phosphate.

A non-chromate corrosion inhibitor provided by the present disclosure can comprise from 2 wt % to 6 wt % of zinc borate; from 1 wt % to 5 wt % of 2-benzothiazolylthiobutanedioic acid; from 35 wt % to 70 wt % of zinc orthophosphate; from 20 wt % to 50 wt % of sodium titanate; and from 3 wt % to 8 wt % of tricalcium phosphate, where wt % is based on the total weight of the non-chromate corrosion inhibitor.

A non-chromate corrosion inhibitor provided by the present disclosure can comprise from 3 wt % to 5 wt % of zinc borate; from 2 wt % to 4 wt % of 2-benzothiazolylthiobutanedioic acid; from 40 wt % to 60 wt % of zinc orthophosphate; from 25 wt % to 45 wt % of sodium titanate; and from 4 wt % to 7 wt % of tricalcium phosphate, where wt % is based on the total weight of the non-chromate corrosion inhibitor.

A curable composition provided by the present disclosure can comprise from 1 wt % to 12 wt % of a non-chromate corrosion inhibitor, from 3 wt % to 9 wt %, or from 5 wt % to 7 wt % of a non-chromate corrosion inhibitor, where wt % is based on the total weight of the curable composition.

A curable composition provided by the present disclosure can comprise from 0.05 wt % to 0.5 wt % of zinc borate; from 0.05 wt % to 0.4 wt % of 2-benzothiazolylthiobutanedioic acid; from 1 wt % to 6 wt % of zinc orthophosphate; from 0.5 wt % to 5 wt % of sodium titanate; and from 0.05 wt % to 0.7 wt % of tricalcium phosphate, where wt % is based on the total weight of the curable composition.

A curable composition provided by the present disclosure can comprise from 0.15 wt % to 0.35 wt % of zinc borate; from 0.1 wt % to 0.3 wt % of (2-benzothiazolylthiobutanedioic acid; from 2.5 wt % to 4.5 wt % of zinc orthophosphate; from 1 wt % to 3 wt % of sodium titanate; and from 0.25 wt % to 0.45 wt % of tricalcium phosphate, where wt % is based on the total weight of the curable composition.

The same or similar wt % content of the zinc borate, 2-benzothiazolylthiobutanedioic acid, zinc orthophosphate, sodium titanate, and tricalcium phosphate, can be present in a cured sealant prepared using a curable composition provided by the present disclosure.

Compositions provided by the present disclosure can be provided as two-part compositions comprising a base composition and an accelerator composition. A base composition can comprise a thiol-terminated polythioether prepolymer, an amine catalyst, fillers, adhesion promoters, and a portion of a non-chromate corrosion inhibitor such as, for example, zinc orthophosphate, sodium titanate, and tricalcium phosphate. An accelerator composition can comprise a polyepoxide curing agent, fillers, adhesion promotors and a portion of the non-chromate corrosion inhibitor such as, for example, zinc borate and 2-benzothiazolylthiobutanedioic acid.

A base composition can comprise from 40 wt % to 80 wt % of a thiol-terminated polythioether prepolymer; from 1 wt % to 7 wt % of zinc orthophosphate; from 0.5 wt % to 5 wt % of sodium titanate; and from 0.1 wt % to 0.7 wt % of tricalcium phosphate, where wt % is based on the total weight of the base composition.

A base composition can comprise from 50 wt % to 70 wt % of a thiol-terminated polythioether prepolymer; from 2 wt % to 6 wt % of zinc orthophosphate; from 2 wt % to 3 wt % of sodium titanate; and from 0.3 w % to 0.5 wt % of tricalcium phosphate, where wt % is based on the total weight of the base composition.

An accelerator composition can comprise from 30 wt % to 60 wt % of a polyepoxide; from 0.5 wt % to 3.5 wt % of zinc borate; and from 0.5 wt % to 3 wt % of 2-benzothiazolylthiobutanedioic acid, where wt % is based on the total weight of the base composition.

An accelerator composition can comprise from 40 wt % to 50 wt % of a polyepoxide; from 1 wt % to 2 wt % of zinc borate; and from 1 wt % to 2 wt % of 2-benzothiazolylthiobutanedioic acid, where wt % is based on the total weight of the base composition.

A base composition and an accelerator composition can be combined and mixed to provide a curable composition. For example, from 10 parts to 30 parts of an accelerator composition can be combined with from 80 parts to 120 parts of a base composition; or from 15 parts to 25 parts of an accelerator composition can be combined with from 90 parts to 110 parts of a base composition to provide a curable composition of the present disclosure, where parts is based on wt %.

Thiol-Terminated Polythioether Prepolymers

Compositions including curable compositions provided by the present disclosure can include a thiol-terminated polythioether prepolymer.

A thiol-terminated polythioether prepolymer may comprise a mixture of different thiol-terminated polythioether prepolymers where the different thiol-terminated polythioether prepolymers may have the same or different functionality. A thiol-terminated polythioether prepolymer can have an average functionality from 2 to 6, from 2 to 4, from 2 to 3, or from 2.05 to 2.8. For example, a thiol-terminated polythioether prepolymer can comprise a difunctional thiol-terminated polythioether prepolymer, a trifunctional thiol-terminated polythioether prepolymer, and a combination thereof.

Examples of suitable thiol-terminated polythioether prepolymers are disclosed, for example, in U.S. Pat. No. 6,172,179, which is incorporated by reference in its entirety. A thiol-terminated polythioether prepolymer comprises Permapol® P3.1E, available from PRC-DeSoto International Inc., Sylmar, Calif. Thiol-terminated polythioether prepolymers can be liquid at room temperature and exhibit a glass transition temperature Tg is less than −50° C., less than −55° C., or less than −60° C. as determined, for example, using AMS 3267 (4.5.4.7) (Aerospace Material Specification), MIL-S-8802E (3.3.12) (Military Specification), MIL-S-29574, or ASTM D522-88 (American Society for Testing and Materials). Thiol-terminated polythioether prepolymer exhibit a number average molecular weight ranging from 500 Daltons to 20,000 Daltons, from 2,000 Daltons to 5,000 Daltons, or from 3,000 Daltons to 4,000 Daltons.

A thiol-terminated polythioether prepolymer can comprise a polythioether prepolymer having a backbone comprising the structure of Formula (1):

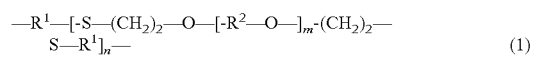

(1)

wherein,
each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a -[(—$CHR^3$—)$_p$-X—]$_q$-($CHR^3$)$_r$— group, wherein each $R^3$ is selected from hydrogen and methyl;
each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a -[(—$CH_2$—)$_p$-X—]$_q$-($CH_2$)$_r$— group;
each X is independently selected from O, S, —NH—, and —N(—$CH_3$—);
m is an integer from 0 to 50;
n is an integer from 1 to 60;
p is an integer from 2 to 6;
q is an integer from 1 to 5; and
r is an integer from 2 to 10.

A thiol-terminated polythioether prepolymer can comprise a thiol-terminated polythioether prepolymer selected from a thiol-terminated polythioether prepolymer of Formula (2a), a thiol-terminated polythioether prepolymer of Formula (2b), or a combination thereof:

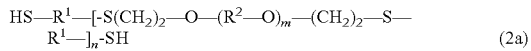

(2a)

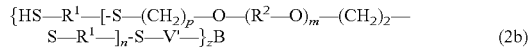

(2b)

where,
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and -[(—$CHR^3$—)$_p$-X—]$_q$-(—$CHR^3$)$_r$—, wherein:
p is an integer from 2 to 6;
q is an integer from 1 to 5;
r is an integer from 2 to 10;
each $R^3$ is independently selected from hydrogen and methyl; and
each X is independently selected from —O—, —S—, and —NR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and -[(—$CHR^3$—)$_p$-X—]$_q$-(—$CHR^3$—)$_r$—, wherein p, q, r, $R^3$, and X are as defined as for $R^1$;
m is an integer from 0 to 50;
n is an integer from 1 to 60;
B represents a core of a z-valent polyfunctionalizing agent B(—V)$_z$ wherein:
z is an integer from 3 to 6; and
each V is a group comprising a terminal group reactive with a thiol group; and
each —V'— is derived from the reaction of —V with a thiol.

In prepolymers of Formula (1), Formula (2a), and Formula (2b), $R^1$ can be -[(—$CH_2$—)$_p$-X—]$_q$-($CH_2$)$_r$—, where p can be 2, X can be —O—, q can be 2, r can be 2, $R^2$ can be ethanediyl, m can be 2, and n can be 9.

In prepolymers of Formula (1), Formula (2a), and Formula (2b), $R^1$ can be selected from $C_{2-6}$ alkanediyl and -[(—$CHR^3$)$_p$—X—]$_q$-($CHR^3$)$_r$—.

In prepolymers of Formula (1), Formula (2a), and Formula (2b), $R^1$ can be -[(—$CHR^3$)$_p$—X—]$_q$-($CHR^3$)$_r$ where X can be —O— or, X can be —S—.

In prepolymers of Formula (1), Formula (2a), and Formula (2b), $R^1$ can be -[(—$CHR^3$)$_p$—X—]$_q$-($CHR^3$)$_r$—, p can be 2, r can be 2, q can be 1, and X can be —S—; or p can be 2, q can be 2, r can be 2, and X can be —O—; or p can be 2, r can be 2, q can be 1, and X can be —O—.

In prepolymers of Formula (1), Formula (2a), and Formula (2b), where $R^1$ can be -[—($CHR^3$)$_p$—X—]$_q$-($CHR^3$)$_r$—, each $R^3$ can be hydrogen or at least one $R^3$ can be methyl.

In prepolymers of Formula (1), Formula (2a), and Formula (2b), each $R^1$ can be the same or at least one $R^1$ can be different.

Various methods can be used to prepare such polythioether prepolymers. Examples of suitable thiol-terminated polythioether prepolymers, and methods for their production, are described, for example, in U.S. Pat. No. 6,172,179. Such thiol-terminated polythioether prepolymers may be difunctional, that is, linear prepolymers having two thiol terminal groups, or polyfunctional, that is, branched prepolymers have three or more thiol terminal groups. Thiol-terminated polythioether prepolymers may also comprise a combination of difunctional and polyfunctional thiol-terminated polythioether prepolymers. Suitable thiol-terminated polythioether prepolymers are commercially available, for example, as Permapol® P3.1E, from PRC-DeSoto International Inc., Sylmar, Calif.

Suitable thiol-terminated polythioether prepolymers may be produced by reacting a divinyl ether or mixtures of divinyl ethers with an excess of dithiol or a mixtures of dithiols. For example, dithiols suitable for use in preparing thiol-terminated polythioether prepolymers include those of Formula (3), other dithiols disclosed herein, or combinations of any of the dithiols disclosed herein.

A dithiol can have the structure of Formula (3):

(3)

wherein:
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and -[—($CHR^3$)$_p$—X—]$_q$-($CHR^3$)$_r$—;
wherein:
each $R^3$ is independently selected from hydrogen and methyl;
each X is independently selected from —O—, —S—, —NH—, and —N(—$CH_3$)—;
p is an integer from 2 to 6;
q is an integer from 1 to 5; and
r is an integer from 2 to 10.

In dithiols of Formula (3), $R^1$ can be -[—($CHR^3$)$_p$—X—]$_q$-($CHR^3$)$_r$—.

In dithiols of Formula (3), X can be selected from —O— and —S—, and thus -[—($CHR^3$)$_p$—X—]$_q$-($CHR^3$)$_r$— in Formula (3) is -[(—$CHR^3$—)$_p$-O—]$_q$-($CHR^3$)$_r$— or -[(—$CHR^3$—)$_p$-S—]$_q$-($CHR^3$)$_r$—. P and r can be equal, such as where p and r are both two.

In dithiols of Formula (3), $R^1$ can be selected from $C_{2-6}$ alkanediyl and -[—($CHR^3$)$_p$—X—]$_q$-($CHR^3$)$_r$—.

In dithiols of Formula (3), $R^1$ can be -[—($CHR^3$)$_p$—X—]$_q$-($CHR^3$)$_r$—, and X can be —O—, X can be —S—.

In dithiols of Formula (3), $R^1$ can be -[—($CHR^3$)$_p$—X—]$_q$-($CHR^3$)$_r$—, p can be 2, r can be 2, q can be 1, and X can be —S—; or p can be 2, q can be 2, r can be 2, and X can be —O—; or p can be 2, r can be 2, q can be 1, and X can be —O—.

In dithiols of Formula (3), $R^1$ can be -[—($CHR^3$)$_p$—X—]$_q$-($CHR^3$)$_r$—, and each $R^3$ can be hydrogen or at least one $R^3$ can be methyl.

Examples of suitable dithiols include, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A dithiol may have one or more pendant groups selected from a lower (e.g., $C_{1-6}$) alkyl group, a lower alkoxy group, and a hydroxyl group. Suitable alkyl pendant groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (3), $R^1$ is -[($-CH_2-$)$_p$-X$-$]$_q$-($CH_2$)$_r-$, wherein p is 2, r is 2, q is 1, and X is $-$S$-$); dimercaptodioxaoctane (DMDO) (in Formula (3), $R^1$ is -[($-CH_2-$)$_p$-X$-$]$_q$-($CH_2$)$_r-$, wherein p is 2, q is 2, r is 2, and X is $-$O$-$); and 1,5-dimercapto-3-oxapentane (in Formula (3), $R^1$ is -[($-CH_2-$)$_p$-X$-$]$_q$-($CH_2$)$_r-$, wherein p is 2, r is 2, q is 1, and X is $-$O$-$). It is also possible to use dithiols that include both heteroatoms in the carbon backbone and pendant alkyl groups, such as methyl groups. Such compounds include, for example, methyl-substituted DMDS, such as HS$-$CH$_2$CH(CH$_3$)$-$S$-$CH$_2$CH$_2-$SH, HS$-$CH(CH$_3$)CH$_2-$S$-$CH$_2$CH$_2-$SH and dimethyl substituted DMDS, such as HS$-$CH$_2$CH(CH$_3$)$-$S$-$CHCH$_3$CH$_2-$SH and HS$-$CH(CH$_3$)CH$_2-$S$-$CH$_2$CH(CH$_3$)$-$SH.

Suitable divinyl ethers for preparing thiol-terminated polythioethers prepolymers include divinyl ethers of Formula (4):

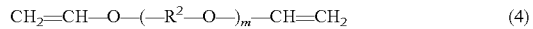

$$CH_2=CH-O-(-R^2-O-)_m-CH=CH_2 \quad (4)$$

where $R^2$ in Formula (4) is selected from a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and -[($-CH_2-$)$_p$-O$-$]$_q$-($CH_2-$)$_r-$, where p is an integer ranging from 2 to 6, q is an integer from 1 to 5, and r is an integer from 2 to 10. A divinyl ether of Formula (4), $R^2$ is a $C_{2-6}$ n-alkanediyl group, a $C_{3-6}$ branched alkanediyl group, a $C_{6-8}$ cycloalkanediyl group, a $C_{6-10}$ alkanecycloalkanediyl group, or -[($-CH_2-$)$_p$-O$-$]$_q$-($-CH_2-$)$_r-$.

Suitable divinyl ethers include, for example, compounds having at least one oxyalkanediyl group, such as from 1 to 4 oxyalkanediyl groups, i.e., compounds in which m in Formula (4) is an integer from 1 to 4. M in Formula (4) can be an integer ranging from 2 to 4. It is also possible to employ commercially available divinyl ether mixtures that are characterized by a non-integral average value for the number of oxyalkanediyl units per molecule. Thus, m in Formula (4) can also take on rational number values ranging from 0 to 10.0, such as from 1.0 to 10.0, from 1.0 to 4.0, or from 2.0 to 4.0.

Examples of suitable divinyl ethers include, divinyl ether, ethylene glycol divinyl ether (EG-DVE) ($R^2$ in Formula (4) is ethanediyl and m is 1), butanediol divinyl ether (BD-DVE) ($R^2$ in Formula (4) is butanediyl and m is 1), hexanediol divinyl ether (HD-DVE) ($R^2$ in Formula (4) is hexanediyl and m is 1), diethylene glycol divinyl ether (DEG-DVE) ($R^2$ in Formula (4) is ethanediyl and m is 2), triethylene glycol divinyl ether ($R^2$ in Formula (4) is ethanediyl and m is 3), tetraethylene glycol divinyl ether (TEG-DVE) ($R^2$ in Formula (4) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such divinyl ether monomers. A divinyl ether may have one or more pendant groups selected from alkyl groups, hydroxyl groups, alkoxy groups, and amine groups.

Divinyl ethers in which $R^2$ in Formula (4) is $C_{3-6}$ branched alkanediyl may be prepared by reacting a polyhydroxy compound with acetylene. Examples of divinyl ethers of this type include compounds in which $R^2$ in Formula (4) is an alkyl-substituted methanediyl group such as $-$CH(CH$_3$)$-$ (for example Pluriol® blends such as Pluriol® E-200 divinyl ether (BASF Corp., Parsippany, N.J.), for which $R^2$ in Formula (4) is ethanediyl and m is 3.8) or an alkyl-substituted ethanediyl (for example $-$CH$_2$CH(CH$_3$)$-$ such as DPE polymeric blends including DPE-2 and DPE-3, International Specialty Products, Wayne, N.J.).

Other useful divinyl ethers include compounds in which $R^2$ in Formula (4) is polytetrahydrofuryl (poly-THF) or polyoxyalkanediyl, such as those having an average of about 3 monomer units.

Two or more types of divinyl ether monomers of Formula (4) may be used. Thus, two dithiols of Formula (3) and one divinyl ether monomer of Formula (4), one dithiol of Formula (3) and two divinyl ether monomers of Formula (4), two dithiols of Formula (3) and two divinyl ether monomers of Formula (4), and more than two dithiols or divinyl ethers of one or both Formula (3) and Formula (4), may be used to produce a variety of thiol-terminated polythioether prepolymers.

A divinyl ether monomer can comprise 20 mole percent to less than 50 mole percent of the reactants used to prepare a thiol-terminated polythioether prepolymer, or 30 mole percent to less than 50 mole percent.

Relative amounts of dithiols and divinyl ethers can be selected to yield polythioether prepolymers having terminal thiol groups. Thus, a dithiol of Formula (3) or a mixture of at least two different dithiols of Formula (3), can be reacted with of a divinyl ether of Formula (4) or a mixture of at least two different divinyl ethers of Formula (4) in relative amounts such that the molar ratio of thiol groups to vinyl groups is greater than 1:1, such as from 1.1:1.0 to 2.0:1.0.

The reaction between compounds of dithiols and divinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be, for example, a free-radical catalyst, an ionic catalyst, or ultraviolet radiation. A catalyst may not comprise an acidic or basic compound, and may not produce acidic or basic compounds upon decomposition. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts include alkyl peroxides, such as t-butyl peroxide. The reaction may also be effected by irradiation with ultraviolet light either with or without a cationic photoinitiating moiety.

Thiol-terminated polythioether prepolymers provided by the present disclosure may be prepared by combining at least one dithiol of Formula (3) and at least one divinyl ether of Formula (4) followed by addition of an appropriate catalyst, and carrying out the reaction at a temperature from 30° C. to 120° C., such as 70° C. to 90° C., for a time from 2 hours to 24 hours, such as from 2 hours to 6 hours.

Thiol-terminated polythioether prepolymers may comprise a polyfunctional polythioether prepolymer having an average functionality of greater than 2.0. Suitable polyfunctional thiol-terminated polythioether prepolymers include, for example, those having the structure of Formula (5):

$$B(\text{-A-SH})_z \quad (5)$$

wherein: (i) -A- comprises, for example, a structure of Formula (1), (ii) B denotes a z-valent residue of a polyfunctionalizing agent; and (iii) z has an average value of greater than 2.0, and, a value between 2 and 3, a value between 2 and 4, a value between 3 and 6, or can be an integer from 3 to 6.

A polyfunctionalizing agent can have the structure $B(-V)_z$ where B represents a core of the z-valent polyfunctionalizing agent, z is an integer from 3 to 6; and each V is a group comprising a terminal group reactive with a thiol group. A group reactive with a thiol group can be an alkenyl group or an epoxy group.

Polyfunctionalizing agents suitable for preparing polyfunctional thiol-terminated polythioether prepolymers can include trifunctionalizing agents, that is compounds where z is 3. Suitable trifunctionalizing agents include, for example, triallyl cyanurate (TAC), 1,2,3-propanetrithiol, isocyanurate-containing trithiols, and combinations thereof, as disclosed in U.S. Publication No. 2010/0010133. Other useful polyfunctionalizing agents include trimethylolpropane trivinyl ether, and the polythiols described in U.S. Pat. Nos. 4,366,307; 4,609,762; and 5,225,472. Mixtures of polyfunctionalizing agents may also be used.

As a result, thiol-terminated polythioether prepolymers suitable for use in compositions provided by the present disclosure may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be affected by factors such as stoichiometry, as will be understood by those skilled in the art.

Thiol-terminated polythioether prepolymers having a functionality greater than 2.0 may be prepared in a manner similar to the difunctional thiol-terminated polythioether prepolymers described in U.S. Application Publication No. 2010/0010133. Polythioether prepolymers may be prepared, for example, by combining (i) one or more dithiols described herein, with (ii) one or more divinyl ethers described herein, and (iii) one or more polyfunctionalizing agents. The mixture may then be reacted, optionally in the presence of a suitable catalyst, to afford a thiol-terminated polythioether prepolymer having a functionality greater than 2.0, such as from 2.1 to 2.9.

Thus, a thiol-terminated polythioether prepolymer can comprise the reaction product of reactants comprising:
(a) a dithiol of Formula (3):

$$HS-R^1-SH \quad (3)$$

wherein:
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $\text{-}[\text{-}(CHR^3\text{-})_p\text{-}X\text{-}]_q\text{-}(CHR^3\text{-})_r\text{-}$;

wherein:
each $R^3$ is independently selected from hydrogen and methyl;
each X is independently selected from —O—, —S—, —NH—, and —N(—CH$_3$—);
p is an integer from 2 to 6;
q is an integer from 1 to 5; and
r is an integer from 2 to 10; and (b) a divinyl ether of Formula (4):

$$CH_2=CH-O-[-R^2-O-]_m-CH=CH_2 \quad (4)$$

wherein:
each $R^2$ is independently selected from $C_{1-10}$ alkanediyl, $C_{6-8}$ cycloalkanediyl, $C_{6-14}$ alkanecycloalkanediyl, and $\text{-}[(-CHR^3\text{-})_p\text{-}X\text{-}]_q\text{-}(-CHR^3\text{-})_r\text{-}$, wherein p, q, r, $R^3$, and X are as defined above;
p is an integer from 0 to 50;
n is an integer from 1 to 60; and
p is an integer from 2 to 6.

And, the reactants can further comprise (c) a polyfunctional compound such as a polyfunctional compound $B(-V)_z$, where B, —V, and z are as defined herein.

Thiol-terminated polythioether prepolymers provided by the present disclosure represent thiol-terminated polythioether prepolymers having a molecular weight distribution. Suitable thiol-terminated polythioether prepolymers can exhibit a number average molecular weight ranging from 500 Daltons to 20,000 Daltons, from 2,000 Daltons to 5,000 Daltons, or from 3,000 Daltons to 4,000 Daltons. Suitable thiol-terminated polythioether prepolymers can exhibit a polydispersity (Mw/Mn; weight average molecular weight/number average molecular weight) ranging from 1 to 20, or from 1 to 5. The molecular weight distribution of thiol-terminated polythioether prepolymers may be characterized by gel permeation chromatography. Thiol-terminated polythioethers provided by the present disclosure can be liquid at room temperature and can be combined and mixed with additives such as fillers, adhesion promoters, pigments, curing agents and/or a non-chromate corrosion inhibitor to provide a composition, curable composition, or sealant provided by the present disclosure.

Compositions provided by the present disclosure can comprise from 30 wt % to 65 wt %, from 35 wt % to 60 wt %, from 40 wt % to 55 wt %, or from 45 wt % to 55 wt % of a thiol-terminated polythioether prepolymer or a combination of thiol-terminated polythioether prepolymers, where wt % is based on the total weight of the composition.

Polyepoxide

Compositions including curable compositions provided by the present disclosure can comprise a polyepoxide curing agent.

Curing agents useful in compositions provided by the present disclosure include those that are reactive with the thiol terminal groups of the thiol-terminated polythioether prepolymer.

A curing agent comprises a polyepoxide curing agent, e.g., an epoxide having two or more reactive epoxy groups. Examples of suitable polyepoxides include polyepoxide resins such as hydantoin diepoxide, diglycidyl ether of bisphenol-A, diglycidyl ether of bisphenol-F, Novolac® type epoxides such as DEN® 438 or DEN® 431 (Dow Chemical), certain epoxidized unsaturated resins, and combinations of any of the foregoing.

A polyepoxide can comprise a diepoxide such as, for example, EPON® 828, DEN® 431, or a combination thereof. EPON® Resin 828 (Momentive) is described as a difunctional bisphenol A/epichlorohydrin derived liquid epoxy resin. DEN® 431 is described as an epoxy novolac resin comprising the reaction product of epichlorohydrin and phenol-formaldehyde novolac having an average epoxy functionality of 2.8. Other examples of suitable polyepoxide resins include Bisphenol A epoxide resins, Bisphenol F epoxide resins, Bisphenol S epoxide resins, novolac epoxide resins, aliphatic epoxide resins including glycidyl epoxide resins and A polyepoxide can comprise a polyfunctional sulfur-containing epoxide such as disclosed in U.S. Pat. No. 8,710,159, which is incorporated by reference.

Curable compositions provided by the present disclosure can comprise from 3 wt % to 10 wt %, from 4 wt % to 9 wt %, from 5 wt % to 8 wt %, or from 6 wt % to 7 wt % of a polyepoxide or a combination of polyepoxides, where wt % is based on the total weight of the curable composition.

A polyepoxide curing agent can comprise an epoxy-functional prepolymer. Examples of suitable epoxy-terminated prepolymers include the epoxy-terminated polythioether prepolymers disclosed in U.S. Pat. No. 7,671,145 and U.S. Pat. No. 8,541,513, each of which is incorporated by reference in its entirety. In general, when used as a curing agent, an epoxy-terminated prepolymer has a number average molecular weight less than about 2,000 Daltons, less than about 1,500, Daltons, less than about 1,000 Daltons, or less than about 500 Daltons. For example, an epoxy-terminated polythioether prepolymer can have a number average molecular weight from 500 Daltons to 2,000 Daltons or from 500 Daltons to 1,000 Daltons. An epoxy-terminated prepolymer may be prepared by reacting a thiol-terminated polythioether prepolymer provided by the present disclosure with a compound having an epoxy group (—CH(—O—CH$_2$—)) and a group reactive with thiol groups such as a monoepoxy of Formula (6):

$$R^4\text{-}R^5\text{---}CH(\text{---}O\text{---}CH_2\text{---}) \quad (6)$$

where $R^4$ comprises a group, other than an epoxy group that is reactive with a thiol group. $R^4$ can be derived from an alkenyl group or an olefin conjugated with an electron attracting group such as acrylates methacrylates, acrylonitrile and methacrylonitrile. $R^5$ can be selected from a $C_{2\text{-}10}$ alkanediyl group, and a $C_{2\text{-}10}$ alkyleneoxy group.

A polyepoxide can also comprise a polybasic acid-based polyepoxide resin. Polybasic acid-based polyepoxide resins comprise a hydrophobic backbone. Hydrophobicity of the backbone can impart enhanced adhesion and corrosion resistance to cured compositions comprising polybasic acid-based epoxies. The increased hydrophobicity can reduce the permeation of gases and/or moisture through the cured sealant and can reduce the mobility of ions at the interface between the sealant and the surface to which the sealant is applied. Both attributes can result in enhanced corrosion resistance. Therefore, suitable polybasic acid-based epoxies can comprise a hydrophobic backbone. Examples of oligomers characterized by hydrophobic backbones include, for example, fatty acids, lipids, polyacrylates, alkylenes, alkyl-substituted ethyleneimine, alkyl acrylamides, styrenes, vinyl ethers, vinyl esters, and/or vinyl halides. Compositions of the present disclosure can comprise a polybasic acid-based epoxy. Polybasic acids are generally viscous liquids produced by the oligomerization of saturated and/or unsaturated fatty acids. The carbon atoms of the constituent fatty acid chains can be linked together in a variety of ways to produce different structural types such as cyclic, monocyclic, bicyclic, and aromatic polybasic acids. Furthermore, within each type there can be many structural isomers. The distribution of the structural types and isomers can depend, for example, on the degree of the saturation of the starting fatty acid monomers and the process conditions employed for oligomerization. Examples of saturated fatty acids include hexadecanoic acid, octadecanoic acid, tetracosanoic acid, and the like. Examples of mono-unsaturated fatty acids include hexandecenoic acid, octadecenoic acid, and cis-tetracosenoic acid, and the like. Examples of polyunsaturated fatty acids include hexandecadienoic acid, octadecadienoic acid, and the like. A fatty acid monomer can be for example, a $C_{4\text{-}60}$ fatty acid, which can have any degree of saturation. Polybasic acid-based epoxies of the present disclosure can be derived from a $C_{18}$ fatty acid.

Polybasic acid-based polyepoxide resins are disclosed in U.S. Application Publication No. 2009/03261676, which is incorporated by reference in its entirety. Polybasic acid-based epoxies can be prepared by reacting a polybasic acid with a polyepoxide. A polyepoxide incorporates two or more epoxy groups. Any appropriate polyepoxide can be used. A polybasic acid-based polyepoxide can have two epoxy groups, three epoxy groups, or more than three epoxy groups. The polybasic acid-based polyepoxide can comprise a single type of polyepoxide or a mixture of polyepoxides. A polyepoxide can comprise a polyepoxide, such as a diepoxide where an epoxide refers to a subgenus of epoxies containing a saturated, three-membered cyclic ether having the structure of Formula (7):

$$\text{---}CH_2\text{---}CH(\text{---}O\text{---}CH_2\text{---}) \quad (7)$$

Examples of useful diepoxides for preparing Polybasic acid-based polyepoxides include hydantoin diepoxide, diglycidyl ethers of bisphenol-A such as EPON® 828 (commercially available from Resolution Performance Products, LLC), diglycidyl ethers of bisphenol-F, novolac type epoxides such as DEN® 431 (commercially available from Dow Plastics), and epoxidized unsaturated phenolic resins, acrylic polyol esters, methacrylic polyol esters, and triallylcyanurate. The stoichiometry of the acid groups of a polybasic acid and the epoxy groups of the epoxy can be selected to produce a polybasic acid-based epoxy having terminal epoxy groups capable of reacting with the terminal thiol groups of a polythioether prepolymer. For example, one mole of a polythioether prepolymer of Formula (2a) can be reacted with 2 moles of a diepoxide, and one mole of a trifunctional polythioether prepolymer of Formula (2b) can be reacted with 6 moles of a diepoxide. Any appropriate reaction method can be used to form a polybasic acid-based epoxide, for example, a polybasic acid-based epoxy can be produced by reacting a polybasic acid and a polyepoxide in the presence of a phenyl phosphine catalyst at a temperature from 110° C. to 120° C. Examples of commercially available polybasic acid-based polyepoxides include Hypox® DA323 (Specialty Chemicals, Inc.), Epotuf® (Reichhold), and Heloxy® (Resolution Performance Products).

Amine Catalyst

Compositions including curable compositions provided by the present disclosure can include an amine catalyst. For example, compositions provided by the present disclosure can include a tertiary amine catalyst. Examples of suitable tertiary-amine catalysts include N,N-dimethylethanolamine (DMEA), triethylene diamine (TEDA), bis(2-dimethylaminoethyl)ether (BDMEE), N-ethylmorpholine, N',N'-dimethylpiperazine, N,N,N',N',N'-pentamethyl-diethylene-triamine (PMDETA), N,N-dimethylcyclohexylamine (DMCHA), N,N-dimethylbenzylamine (DMBA), N,N-dimethylcethylamine, N,N,N',N'',N''-pentamethyl-dipropylenetriamine (PMDPTA), tritethylamine, 1-(2-hydroxypropl) imidazole, 1,8-diazabicyclo[5.4.0]undec-7-ene bicarbonate (DBU), 1,4-diazabicyclo[2.2.2]octane (DABCO®) such as DABCO® 33-LV (Air Products and Chemicals).

Suitable tertiary-amine catalysts for use in compositions provided by the present disclosure include those particularly suited for epoxide systems including, for example, dimethylaminomethylphenol, 2,4,6-tri(diemethylaminomethyl) phenol, 2-ethylhexanoic acid salt, imidazole, imidazole-based catalysts, and combinations of any of the foregoing.

Compositions provided by the present disclosure can comprise 1,4-diazabicyclo[2.2.2]octane, 2,4,6-tri(diemethylaminomethyl)phenol, imidazole, or a combination of any of the foregoing.

Compositions provided by the present disclosure can comprise from 0.01 wt % to 0.2 wt % such as from 0.03 wt % to 0.13 wt % of a tertiary amine catalyst or a combination of tertiary amine catalysts, where wt % is based on the total weight of the curable composition. Compositions provided by the present disclosure can comprise from 0.05 wt % to 1.5 wt % such as from 0.05 wt % to 1 wt % or from 0.05 wt % to 0.5 wt %, of a tertiary amine catalyst or a combination of tertiary amine catalysts such as 1,4-diazabicyclo[2.2.2]octane (DABCO®), 2,4,6-tris(dimethylaminomethyl)phenol (DMP-30) or imidazole, where wt % is based on the total weight of the curable composition.

Sealant Formulations

Uncured sealants provided by the present disclosure can be provided as a two part system comprising a base component and an accelerator component which can be prepared and stored separately, combined, and mixed at the time of use.

The base component or composition can comprise the thiol-terminated polythioether prepolymer, a catalyst and a first portion of the non-chromate corrosion inhibitor. The accelerator component or composition can comprise the polyepoxide curing agent and a second portion of the non-chromate corrosion inhibitor. The first and second portions can comprise different components of the non-chromate corrosion inhibitor.

The base component and the accelerator component can be formulated to be rendered compatible when combined such that the constituents of the base and accelerator components can intermix and be homogeneously dispersed to provide a sealant composition for application to a substrate. Factors affecting the compatibility of the base and accelerator components include, for example, viscosity, pH, density, and temperature.

Curable compositions provided by the present disclosure can be advantageously used as sealants, and in particular, as sealants where low temperature flexibility and resistance to fuel are desirable attributes. For example, curable compositions can be used as aviation and aerospace sealants. A sealant refers to a curable composition that has the ability when cured to resist atmospheric conditions such as moisture and temperature and at least partially block the transmission of materials such as water, water vapor, fuel, solvents, and/or liquids and gases.

Uncured sealant compositions provided by the present disclosure can be formulated as suitable for a particular aerospace sealant application. For example, sealant compositions can be formulated as Class A, Class s B, or as Class C fuel resistant aerospace sealants.

A Class A sealant can be formulated for use at service temperatures from −65° F. (−54° C.) to 250° F. (121° C.) with intermittent excursions to 275° F. (135° F.). A Class A sealant is intended to be applied by brushing and can be used, for example, for as brush sealing fasteners in fuel tanks and other aircraft fuselage sealing applications. A Class A sealant can have an initial viscosity from 1 poise to 500 poise.

A Class B sealant can be formulated for use at service temperatures from −65° F. to 250° F. (−54° C. to 121° C.) and is intended for fillet sealing and other aircraft fuselage sealing applications. A Class B sealant can have an initial viscosity from 4,500 poise to 20,000 poise. A Class B sealant can be applied by extrusion, injection gun, or spatula.

A Class C sealant can be formulated for use at service temperatures from −65° F. to 250° F. (−54° C. to 121° C.) and is intended for brush and fay sealing of fuel tanks and other aircraft fuselage sealing applications. A Class C sealant can have an initial viscosity from 500 poise to 4,500 poise. A Class C sealant can be applied by brush, roller, spatula, or extrusion.

Formulations

Compositions provided by the present disclosure may be formulated as sealants. By formulated is meant that in addition to the reactive species forming the cured polymer network, additional material can be added to a composition to impart desired properties to the uncured sealant and/or to the cured sealant. For the uncured sealant these properties can include viscosity, pH, and/or rheology. For cured sealants, these properties can include weight, adhesion, corrosion resistance, color, glass transition temperature, electrical conductivity, cohesion, and/or physical properties such as tensile strength, elongation, and hardness. Compositions provided by the present disclosure may comprise one or more additional components suitable for use in aerospace sealants and depend at least in part on the desired performance characteristics of the cured sealant under conditions of use.

Compositions provided by the present disclosure can comprise one or more adhesion promoters. The composition may contain from 0.1 wt % to 15 wt % of an adhesion promoter, less than 5 wt %, less than 2 wt %, or less than 1 wt % of an adhesion promoter, based on the total dry weight of the composition. Examples of adhesion promoters include phenolics, such as Methylon® phenolic resin, and organosilanes, such as epoxy-, mercapto- or amino-functional silanes, including, for example, Silquest® A-187 and Silquest® A-1100. Other useful adhesion promoters are known in the art.

Suitable adhesion promoters include sulfur-containing adhesion promoters such as those disclosed in U.S. Pat. Nos. 8,513,339, 8,952,124, and 9,056,949; and U.S. Application Publication No. 2014/0051789, each of which is incorporated by reference.

Compositions provided by the present disclosure may comprise one or more different types of filler. Suitable fillers include those commonly known in the art, including inorganic fillers, such as carbon black and calcium carbonate ($CaCO_3$), silica, polymer powders, and lightweight fillers. Examples of electrically non-conductive fillers include materials such as, but not limited to, calcium carbonate, mica, polyamide, fumed silica, molecular sieve powder, microspheres, titanium dioxide, chalks, alkaline blacks, cellulose, zinc sulfide, heavy spar, alkaline earth oxides, and alkaline earth hydroxides. A composition can include 5 wt % to 60 wt % of a filler or combination of fillers, 10 wt % to 50 wt %, or from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

Compositions provided by the present disclosure can include low density filler particles. Low density particles refers to particles that have a specific gravity of no more than 0.7, no more than 0.25, or no more than 0.1. Suitable lightweight filler particles often fall within two categories microspheres and amorphous particles. The specific gravity of microspheres may range from 0.1 to 0.7 and include, for example, polystyrene foam, microspheres of polyacrylates and polyolefins, and silica microspheres having particle sizes ranging from 5 microns to 100 microns and a specific gravity of 0.25 (Eccospheres®). Other examples include alumina/silica microspheres having particle sizes in the range of 5 to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 μm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). Compositions provided by the present disclosure can include lightweight filler particles comprising an exterior surface coated with a thin coating, such as those described in U.S. Application Publication No. 2010/0041839, which is incorporated by reference in its entirety. Suitable lightweight fillers are also disclosed in U.S. Pat. No. 6,525,168.

A composition can comprise less than 2 wt % of lightweight particles, less than 1.5 wt %, less than 1.0 wt %, less than 0.8 wt %, less than 0.75 wt %, less than 0.7 wt %, or less than 0.5 wt % of a composition, where wt % is based on the total dry solids weight of the composition.

A composition provided by the present disclosure can comprise light weight fillers that reduce the specific gravity of the composition. For example, a composition can have a specific gravity from 0.8 to 1, 0.7 to 0.9, from 0.75 to 0.85, from 0.9 to 1.2, from 1.0 to 1.2, or about 0.8 or about 1.1. A composition can have a specific gravity from 1.02 to 1.22, from 1.04 to 1.20, from 1.06 to 1.18, from 1.08 to 1.16, from 1.10 to 1.14, or from 1.11 to 1.13. The specific gravity of a composition can be less than about 1.2, less than about 1.1, less than about 1.0, less than 0.9, less than about 0.8, less than about 0.75, less than about 0.7, less than about 0.65, less than about 0.6, or less than about 0.55.

A composition provided by the present disclosure can comprise an electrically conductive filler. Electrical conductivity and EMI/RFI shielding effectiveness can be imparted to a composition by incorporating conductive materials. The conductive elements can include, for example, metal or metal-plated particles, fabrics, meshes, fibers, and combinations thereof. The metal can be in the form of, for example, filaments, particles, flakes, or spheres. Examples of suitable metals include copper, nickel, silver, aluminum, tin, and steel. Other conductive materials that can be used to impart EMI/RFI shielding effectiveness to polymer compositions include conductive particles or fibers comprising carbon or graphite. Conductive polymers such as polythiophenes, polypyrroles, polyaniline, poly(p-phenylene) vinylene, polyphenylene sulfide, polyphenylene, and polyacetylene can also be used.

Electrically conductive fillers also include high band gap materials such as zinc sulfide and inorganic barium compounds.

Fillers used to impart electrical conductivity and EMI/RFI shielding effectiveness to polymer compositions are well known in the art. Examples of electrically conductive fillers further include electrically conductive noble metal-based fillers such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal-based materials can also be used and include, for example, non-noble metal-plated non-noble metals such as copper-coated iron particles or nickel plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive fillers can also be used to meet the desired conductivity, EMI/RFI shielding effectiveness, hardness, and other properties suitable for a particular application.

The shape and size of the electrically conductive fillers used in compositions of the present disclosure can be any appropriate shape and size to impart EMI/RFI shielding effectiveness to the cured composition. For example, fillers can be of any shape that is generally used in the manufacture of electrically conductive fillers, including spherical, flake, platelet, particle, powder, irregular, fiber, and the like. In certain sealant compositions of the disclosure, a base composition can comprise Ni-coated graphite as a particle, powder or flake. The amount of Ni-coated graphite in a base composition can range from 40 wt % to 80 wt %, or can range from 50 wt % to 70 wt %, based on the total weight of the base composition. An electrically conductive filler can comprise Ni fiber. Ni fiber can have a diameter ranging from 10 μm to 50 μm and have a length ranging from 250 μm to 750 μm. A base composition can comprise, for example, an amount of Ni fiber ranging from 2 wt % to 10 wt %, or from 4 wt % to 8 wt %, based on the total weight of the base composition.

Carbon fibers, particularly graphitized carbon fibers, can also be used to impart electrical conductivity to sealant compositions. Carbon fibers formed by vapor phase pyrolysis methods and graphitized by heat treatment and which are hollow or solid with a fiber diameter ranging from 0.1 micron to several microns, have high electrical conductivity. As disclosed in U.S. Pat. No. 6,184,280, carbon microfibers, nanotubes or carbon fibrils having an outer diameter of less than 0.1 μm to tens of nanometers can be used as electrically conductive fillers. An example of graphitized carbon fiber suitable for conductive compositions of the present disclosure include Panex® 3OMF (Zoltek Companies, Inc., St. Louis, Mo.), a 0.921 μm diameter round fiber having an electrical resistivity of 0.00055 Ω-cm.

The average particle size of an electrically conductive filler can be within a range useful for imparting electrical conductivity to a polymer-based composition. For example, the particle size of the one or more fillers can range from 0.25 μm to 250 μm, from 0.25 μm to 75 μm, or from 0.25 μm to 60 µm. Compositions of the present disclosure can comprise Ketjenblack® EC-600 JD (Akzo Nobel, Inc., Chicago, Ill.), an electrically conductive carbon black characterized by an iodine absorption of 1000 mg/g to 11500 mg/g (J0/84-5 test method), and a pore volume of 480 $cm^3$/100 gm to 510 $cm^3$/100 gm (DBP absorption, KTM 81-3504). An electrically conductive carbon black filler can comprise Black Pearls 2000 (Cabot Corporation, Boston, Mass.).

Electrically conductive polymers can be used to impart or modify the electrical conductivity of sealant compositions of the present disclosure. Polymers having sulfur atoms incorporated into aromatic groups or adjacent double bonds, such as in polyphenylene sulfide, and polythiophene, are known to be electrically conductive. Other electrically conductive polymers include, for example, polypyrroles, polyaniline, poly(p-phenylene) vinylene, and polyacetylene. Furthermore, thiol-terminated prepolymers can comprise aromatic sulfur groups and sulfur atoms adjacent conjugated double bonds such as vinylcyclohexene-dimercaptodioxaoctane groups incorporated into the backbone of the thiol-terminated prepolymer, to enhance the electrical conductivity.

Compositions of the present disclosure can comprise more than one electrically conductive filler and the more than one electrically conductive filler can be of the same or different materials and/or shapes. For example, a sealant composition can comprise electrically conductive Ni fibers, and electrically conductive Ni-coated graphite in the form of powder, particles and/or flakes. The amount and type of electrically conductive filler can be selected to produce a sealant composition which, when cured, exhibits a sheet resistance (four-point resistance) of less than 0.50 $\Omega./cm^2$, or a sheet resistance less than 0.15 $\Omega/cm^2$. The amount and type of filler can also be selected to provide effective EMI/RFI shielding over a frequency range from 1 MHz to 18 GHz.

Galvanic corrosion of dissimilar metal surfaces and the conductive compositions of the present disclosure can be minimized or prevented by adding corrosion inhibitors to the composition, and/or by selecting appropriate conductive fillers. The non-chromate corrosion inhibitors provided by the present disclosure can increase the corrosion resistance of sealants comprising an electrically conductive filler U.S. Pat. No. 5,284,888 and U.S. Pat. No. 5,270,364 disclose the use of aromatic triazoles to inhibit corrosion of aluminum and steel surfaces that can also be included in a sealant composition provided by the present disclosure. A sacrificial oxygen scavenger such as Zn can be used as a corrosion inhibitor. A corrosion inhibitor can comprise less than 10% by weight of the total weight of the electrically conductive composition. A corrosion inhibitor can comprise an amount ranging from 2 wt % to 8 wt % of the total weight of the electrically conductive composition. Corrosion between dissimilar metal surfaces can also be minimized or prevented by the selection of the type, amount, and properties of the conductive fillers comprising the composition.

An electrically conductive filler can be added to the base component or the accelerator component of a two-part sealant composition. An electrically conductive base composition can comprise an amount of electrically nonconductive filler from 2 wt % to 10 wt % based on the total weight of the base composition, or can range from 3 wt % to 7 wt %. An accelerator composition can comprise an amount of electrically non-conductive filler from less than 6 wt % or from 0.5% to 4% by weight, based on the total weight of the accelerator composition.

A sealant composition can comprise from about 50 wt % to about 90 wt % of a thiol-terminated polythioether prepolymer, from about 60 wt % to about 90 wt %, from about 70 wt % to about 90 wt %, or from about 80 wt % to about 90 wt % of a thiol-terminated polythioether prepolymer, where wt % is based on the total dry solids weight of the sealant composition.

A sealant composition may also include additives such as plasticizers, pigments, surfactants, adhesion promoters, thixotropic agents, fire retardants, masking agents, accelerators (such as amines, including 1,4-diaza-bicyclo[2.2.2] octane, DABCO®), and combinations of any of the foregoing. When used, the additives may be present in a composition in an amount ranging, for example, from about 0 wt % to about 60 wt %. Additives may be present in a composition in an amount ranging from about 25 wt % to 60 wt %.

Uses

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. In particular, sealant compositions provided by the present disclosure are useful as aerospace sealants and can be used, for example, in linings for fuel tanks.

Compositions, such as sealants, may be provided as multi-part compositions, such as two-part compositions, where one part comprises one or more thiol-terminated polythioether prepolymers and a second part comprises one or more polyepoxides. Additives and/or other materials may be added to either part as desired or necessary. The two parts may be combined and mixed prior to use. The working time of the mixed sealant composition can be at least 12 hours, at least 24 hours, at least 48 hours, or more than 48 hours, where working time refers to the period of time the mixed composition remains malleable, e.g., has a sufficiently low viscosity, for application to a surface after mixing.

A composition cures to a tack-free cure within about 24 hours to about 72 hours at a temperature of about 25° C. or higher after the composition is no longer workable. The time to form a viable seal using moisture-curable compositions provide by the present disclosure can depend on several factors as can be appreciated by those skilled in the art, and as defined by the requirements of applicable standards and specification. In general, curable compositions provided by the present disclosure can develop adhesion strength within about 3 days to about 7 days following application to a surface. In general, full adhesion strength as well as other properties of cured compositions provided by the present disclosure can become fully developed within 7 days following mixing and application of a curable composition to a surface.

Compositions provided by the present disclosure can have a working time greater than about 12 hours, and can cure to a Shore A hardness of 25 A in from about 150 hours to about 250 hours.

Compositions, including sealants, provided by the present disclosure may be applied to any of a variety of substrates. Examples of substrates to which a composition may be applied include metals such as titanium, stainless steel, steel alloy, aluminum, and aluminum alloy, any of which may be anodized, primed, organic-coated or chromate-coated; epoxy; urethane; graphite; fiberglass composite; Kevlar®; acrylics; and polycarbonates. Compositions provided by the present disclosure may be applied to a substrate such as aluminum and aluminum alloy.

Sealant compositions provided by the present disclosure may be formulated as Class A, Class B, or Class C sealants. A Class A sealant refers to a brushable sealant having a viscosity of about 1 poise to about 500 poise and is designed for brush application. A Class B sealant refers to an extrudable sealant having a viscosity from 4,500 poise to 20,000 poise and is designed for application by extrusion via a pneumatic gun. A Class B sealant can be sued to form fillets and sealing on vertical surfaces or edges where low slump/slag is required. A Class C sealant has a viscosity from 500 poise to 4,500 poise and is designed for application by a roller or combed tooth spreader. A Class C sealant can be used for fay surface sealing.

Compositions provided by the present disclosure may be applied directly onto the surface of a substrate or over an underlayer by any suitable coating process known to those of ordinary skill in the art.

Furthermore, methods are provided for sealing an aperture utilizing a composition provided by the present disclosure. These methods comprise, for example, providing the curable composition of the present disclosure; applying the curable composition to at least one surface of a part; and curing the applied composition to provide a sealed part.

A composition provided by the present disclosure may be cured under ambient conditions, where ambient conditions refers to a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, e.g., 25° C. A composition may be cured upon exposure to actinic radiation, such as ultraviolet radiation. As will also be appreciated, the methods may be used to seal apertures on aerospace vehicles including aircraft and aerospace vehicles.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within about 3 days to about 7 days following mixing and application to a surface. In general, full adhesion strength as well as other properties of cured compositions of the present disclosure becomes fully developed within 7 days following mixing and application of a curable composition to a surface.

Cured compositions provided by the present disclosure, such as cured sealants, exhibit properties acceptable for use in aerospace sealant applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated by reference. It is also desirable that, when cured, compositions of the present disclosure used in aviation and aircraft applications exhibit a percent volume swell not greater than 25% following immersion for one week at 60° C. (140° F.) and ambient pressure in JRF type 1. Other properties, ranges, and/or thresholds may be appropriate for other sealant applications.

Cured compositions provided by the present disclosure can be fuel-resistant. The term "fuel resistant" means that a composition, when applied to a substrate and cured, can provide a cured product, such as a sealant, that exhibits a percent volume swell of not greater than 40%, in some cases not greater than 25%, in some cases not greater than 20%, and in other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1 etc., available from SAE (Society of Automotive Engineers)).

Compositions provided by the present disclosure provide a cured product, such as a sealant, exhibiting a tensile elongation of at least 200% and a tensile strength of at least 200 psi when measured in accordance with the procedure described in AMS 3279, § 3.3.17.1, test procedure AS5127/1, § 7.7. In general, for a Class A sealant there is no tensile and elongation requirement. For a Class B sealant, as a general requirement, tensile strength is equal to or greater than 200 psi and elongation is equal to or greater than 200%. Acceptable elongation and tensile strength can be different depending on the application.

Compositions provide a cured product, such as a sealant, that exhibits a lap shear strength of greater than 200 psi, such as at least 220 psi, at least 250 psi, and, in some cases, at least 400 psi, when measured according to the procedure described in SAE AS5127/1 paragraph 7.8.

A cured sealant prepared from a composition provided by the present disclosure meets or exceeds the requirements for aerospace sealants as set forth in AMS 3277.

Apertures, surfaces, joints, fillets, fay surfaces including apertures, surfaces, fillets, joints, and fay surfaces of aerospace vehicles, sealed with compositions provided by the present disclosure are also disclosed.

An electrically conductive sealant composition provided by the present disclosure can exhibit the following properties measured at room temperature following exposure at 500° F. for 24 hours: a surface resistivity of less than 1 ohms/square, a tensile strength greater than 200 psi, an elongation greater than 100%, and a cohesive failure of 100% measured according to MIL-C-27725.

EXAMPLES

Embodiments provided by the present disclosure are further illustrated by reference to the following examples, which describe the synthesis, properties, and uses of certain thiol-terminated prepolymers, polyepoxides, and non-chromate corrosion inhibitors; and compositions comprising thiol-terminated prepolymers, polyepoxides, and non-chromate corrosion inhibitors. It will be apparent to those skilled in the art that many modifications, both to materials, and methods, may be practiced without departing from the scope of the disclosure.

Example 1

Class A Sealant

The sealant of Example 1 is a Class A sealant suitable for use in brush-on applications. The sealant of Example 1 consists of two parts, an accelerator (referred as Part A) and a base (referred as Part B). The accelerator formulation is shown in Table 1A.

TABLE 1A

Accelerator Formulation.

| Material | Parts (gm) |
|---|---|
| Epon ® Resin 828 | 32.45 |
| Epoxy Novolac DEN ® 431 Epoxy | 13.91 |
| Hydrogenated Terphenyl (HB-40 ®) | 11.13 |
| Carbon Black | 0.23 |
| Zinc Borate | 1.76 |
| Precipitated Calcium Carbonate | 34.12 |
| Coated Calcium Carbonate | 4.64 |
| 2-Benzothiazolythiobutanedioic acid | 1.21 |
| Silane Intermediate, T-1601* | 0.37 |
| Carbamate Intermediate, T-5143* | 0.19 |

*Available from PRC-DeSoto International, Inc., Sylmar, CA.

The preparation of Part A is described as follows. Epon® 828, DEN® 431, and HB-40® are charged to a 1.25 gallon FlackTek Hauschild cup. Using a Hauschild FlackTek Speedmixer DAC 3000 HP, the materials were mixed for 1 min at 1,000 rpm. Carbon black, zinc borate, and precipitated calcium carbonate were then added. The composition was mixed for 2 min each at rate of 200 rpm, 400 rpm, 600 rpm, 800 rpm and 1,000 rpm for a total of 10 min of mixing. Coated calcium carbonate and 2-benzothiazolythiobutanedioic acid were then added. The composition was mixed for 2 min each at 200 rpm, 400 rpm, 600 rpm, 800 rpm and 1,000 rpm for a total of 10 minutes of mixing. T-1601 was added and the composition mixed for 1 min at 800 rpm. T-5143 was added and the composition mixed for 1 min at 800 rpm. Finally, the container with Part A was placed in an oven at 140° F. for 7 days.

The components of the base formulation (Part B) is shown in Table 1B.

TABLE 1B

Part B Formulation.

| Material | Parts (gm) |
|---|---|
| Thiol-terminated Polythioether Prepolymer** | 54.38 |
| Cooked Phenolics Resin, T-3921*** | 0.18 |
| Cooked Phenolics Resin, T-3920*** | 0.49 |
| Methylon ® 75108 Resin | 0.74 |
| Hydrated Alumina | 3.54 |
| Uncoated Calcium Carbonate | 5.88 |
| Zinc Orthophosphate | 4.17 |
| Coated Calcium Carbonate | 13.72 |
| Sodium Titanate | 2.37 |

TABLE 1B-continued

Part B Formulation.

| Material | Parts (gm) |
|---|---|
| Hydrogenated Terphenyl (HB-40 ®) | 1.82 |
| Tricalcium Phosphate | 0.39 |
| Expancel ® 920 DET 40 d25 | 0.64 |
| Tetra n-butyl titanate (TNBT) | 0.25 |
| DABCO ® 33-LV | 0.7 |
| 3-aminopropyltriethoxysilane | 0.73 |
| Ethyl Acetate | 10.01 |

**A thiol-terminated prepolymer, available from PRC-DeSoto International, Inc., Sylmar, CA.
***Phenolics adhesion promoter, available from PRC-DeSoto International, Inc., Sylmar, CA.

The preparation of Part B is described as follows. Polythioether prepolymer, T-3920, T-3921 and Methylon® 75108 were added to a 300 XL FlackTek Hauschild cup. Using a Hauschild Speedmixer 1100.1 VAC-P (for all mixing steps), the components were mixed for 3 min at 1,500 rpm under vacuum.

Hydrated alumina, uncoated calcium carbonate, zinc orthophosphate, and coated calcium carbonate were then added and the composition mixed for 1 min at 1,500 rpm, followed by 2 min at 1,000 rpm under vacuum. Using a spatula, any remaining unmixed dry material was removed from the sides of cup and mixed in. The mixing procedure was repeated.

Sodium titanate, HB-40®, and tricalcium phosphate were added to the mixed composition. The composition was mixed for 2 minutes at 1,200 rpm under vacuum. The material was then allowed to cool to room temperature. Expancel® 920 DET 40 d25 was then added and the composition mixed for 1 min at 1,000 rpm, followed by 2 min at 1,200 rpm. Tetra n-butyl titanate was added and the composition immediately hand-mix thoroughly with a spatula and then mixed for 1 min at 1,200 rpm. DABCO® 33-LV was added to the composition and immediately hand-mixed thoroughly with a spatula and then mixed for 1 min at 1,200 rpm. 3-Aminopropyltriethoxysilane was added to the composition and the composition mixed for 1 min at 1,200 rpm. Ethyl acetate was added and hand-mixed for 1 min at 1,200 rpm.

The sealant was prepared by combining 17.25 parts of Part A with 100 parts of Part B by weight. The composition was hand-mix thoroughly with a spatula until no yellow or black material was observed on the sides and bottom of the cup. The composition was then mixed for 2 min at 1,200 rpm under a 100% vacuum using a FlackTek Hauschild Speedmixer 1100.1 VAC-P. After mixing, test samples were prepared and tested according to MIL-PRF-81733D. The results are shown in Tables 1C and 1D.

TABLE 1C

Example 1 - Properties.

| Property | Value |
|---|---|
| Non-volatile Content | 91% |
| Initial Base Viscosity | 397 poise |
| Application Time - Viscosity at 2 hrs | 376 poise |
| Tack-free Time | 6.25 hours |
| Hardness | 41 A |
| Specific Gravity | 1.12 |
| Thermal Stability | PASS, +0 A |

TABLE 1D

Example 1 - Peel Strength.

| Substrate | Test Condition | pli/% cohesive failure |
|---|---|---|
| MIL-C-81706 (Alodine) | Standard Conditions (Dry) | 29/100 |
| | 2 days @ 140° F. in AMS2629 (JRF) | 25/100 |
| | 2 days @ 140° F. in 3% NaCl Water | 27/100 |
| | 2 days @ 140° F. in MIL-PRF-83282 | 28/100 |
| | 2 days @ 140° F. in MIL-PRF-7808 | 33/100 |
| | 2 days @ 140° F. in MIL-PRF-23699 | 25/100 |
| MIL-A-8625 (SAA) | Standard Conditions (Dry) | 34/100 |
| | 2 days @ 140° F. in AMS2629 (JRF) | 26/100 |
| MIL-A-8625 (SAA) | 2 days @ 140° F. in 3% NaCl Water | 35/100 |
| | 2 days @ 140° F. in MIL-PRF-83282 | 31/100 |
| | 2 days @ 140° F. in MIL-PRF-7808 | 31/100 |
| | 2 days @ 140° F. in MIL-PRF-23699 | 33/100 |
| AMS-QQ-P-416 (Cadmium) | Standard Conditions (Dry) | 34/100 |
| | 2 days @ 140° F. in AMS2629 (JRF) | 25/100 |
| | 2 days @ 140° F. in 3% NaCl Water | 35/100 |
| | 2 days @ 140° F. in MIL-PRF-83282 | 39/100 |
| | 2 days @ 140° F. in MIL-PRF-7808 | 40/100 |
| | 2 days @ 140° F. in MIL-PRF-23699 | 31/100 |
| AMS4376, AMS-M-3171 (Alodine Magnesium) | Standard Conditions (Dry) | 21/100 |
| | 2 days @ 140° F. in AMS2629 (JRF) | 24/100 |
| | 2 days @ 140° F. in 3% NaCl Water | 22/100 |
| | 2 days @ 140° F. in MIL-PRF-83282 | 20/100 |
| | 2 days @ 140° F. in MIL-PRF-7808 | 20/100 |
| | 2 days @ 140° F. in MIL-PRF-23699 | 20/100 |
| AMS4911 (Titanium) | Standard Conditions (Dry) | 32/100 |
| | 2 days @ 140° F. in AMS2629 (JRF) | 24/100 |
| | 2 days @ 140° F. in 3% NaCl Water | 37/100 |
| | 2 days @ 140° F. in MIL-PRF-83282 | 36/100 |
| | 2 days @ 140° F. in MIL-PRF-7808 | 36/100 |
| | 2 days @ 140° F. in MIL-PRF-23699 | 32/100 |
| MIL-PRF-23377 | Standard Conditions (Dry) | 34/100 |
| | 2 days @ 140° F. in AMS2629 (JRF) | 30/100 |
| | 2 days @ 140° F. in 3% NaCl Water | 36/100 |
| | 2 days @ 140° F. in MIL-PRF-83282 | 36/100 |
| | 2 days @ 140° F. in MIL-PRF-7808 | 31/100 |
| | 2 days @ 140° F. in MIL-PRF-23699 | 21/100 |
| AS4/3501-6 (Composite) | Standard Conditions (Dry) | 31/100 |
| | 2 days @ 140° F. in AMS2629 (JRF) | 28/100 |
| | 2 days @ 140° F. in 3% NaCl Water | 36/100 |

Example 2

Class A Sealant

The sealant of Example 2 is a Class A sealant suitable for use in brush-on applications. The sealant of Example 2 consists of two parts, an accelerator (referred as Part A) and a base (referred as Part B). The accelerator formulation is shown in Table 2A.

TABLE 2A

Accelerator Formulation.

| Material | Parts (gm) |
|---|---|
| Epon ® Resin 828 | 32.45 |
| Epoxy Novolac DEN ® 431 Epoxy | 13.91 |
| Hydrogenated Terphenyl (HB-40 ®) | 11.13 |
| Carbon Black | 0.23 |
| Zinc Borate | 1.76 |
| Precipitated Calcium Carbonate | 34.12 |
| Coated Calcium Carbonate | 4.64 |
| 2-Benzothiazolythiobutanedioic acid | 1.21 |
| Silane Intermediate, T-1601* | 0.37 |
| Carbamate Intermediate, T-5143* | 0.19 |

*Available from PRC-DeSoto International, Inc., Sylmar, CA.

Part A was prepared as described in Example 1.

The components for the base formulation (Part B) are shown in Table 2B.

TABLE 2B

Part B Formulation.

| Material | Parts (gm) |
|---|---|
| Thiol-terminated Polythioether Prepolymer** | 54.38 |
| Cooked Phenolics Resin, T-3921*** | 0.18 |
| Cooked Phenolics Resin, T-3920*** | 0.49 |
| Methylon ® 75108 Resin | 0.74 |
| Hydrated Alumina | 3.55 |
| Uncoated Calcium Carbonate | 5.89 |
| Zinc Orthophosphate | 4.18 |
| Coated Calcium Carbonate | 13.75 |
| Sodium Titanate | 2.37 |
| Hydrogenated Terphenyl (HB-40 ®) | 1.82 |
| Tricalcium Phosphate | 0.39 |
| Expancel ® 920 DET 40 d25 | 0.64 |
| Tetra n-butyl titanate (TNBT) | 0.25 |
| DABCO ® 33-LV | 0.49 |
| 3-Aminopropyltriethoxysilane | 0.73 |
| Ethyl Acetate | 10.03 |

**A thiol-terminated prepolymer, available from PRC-DeSoto International, Inc., Sylmar, CA.
***Phenolic adhesion promoters, available from PRC-DeSoto International, Inc., Sylmar, CA.

Part B was prepared as described in Example 1.

The sealant of Example 2 was prepared by combining 17.25 parts of Part A with 100 parts of Part B by weight. The composition was hand-mixed with spatula until no yellow or black material was observed on the sides and bottom of the cup. The composition was then mixed for mix 2 min at 1,200 rpm under vacuum on a FlackTek Hauschild Speedmixer 1100.1 VAC-P. After mixing, test samples were prepared and tested according to MIL-PRF-81733D. The results are shown in Tables 2C and 2D.

TABLE 2C

Example 2 - Properties.

| Property | Value |
|---|---|
| Nonvolatile Content | 91% |
| Initial Base - Viscosity | 362 poise |
| Application Time - Viscosity at 2 hrs | 496 poise |
| Tack-free Time | 8.5 hours |
| Hardness | 42 A |
| Specific Gravity | 1.17 |
| Thermal Stability | PASS, +0 A |

TABLE 2D

Example 2 - Peel Strength

| Substrate | Test Condition | pli/% cohesive failure |
|---|---|---|
| MIL-C-81706 (Alodine) | Standard Conditions (Dry) | 43/100 |
| | 2 days @ 140° F. in AMS2629 (JRF) | 25/100 |
| | 2 days @ 140° F. in 3% NaCl Water | 41/100 |
| | 2 days @ 140° F. in MIL-PRF-83282 | 39/100 |
| | 2 days @ 140° F. in MIL-PRF-7808 | 34/100 |
| | 2 days @ 140° F. in MIL-PRF-23699 | 32/100 |
| MIL-A-8625 (SAA) | Standard Conditions (Dry) | 42/100 |
| | 2 days @ 140° F. in AMS2629 (JRF) | 26/100 |
| MIL-A-8625 (SAA) | 2 days @ 140° F. in 3% NaCl Water | 36/100 |
| | 2 days @ 140° F. in MIL-PRF-83282 | 36/100 |
| | 2 days @ 140° F. in MIL-PRF-7808 | 34/100 |
| | 2 days @ 140° F. in MIL-PRF-23699 | 22/100 |

TABLE 2D-continued

Example 2 - Peel Strength

| Substrate | Test Condition | pli/% cohesive failure |
|---|---|---|
| AMS-QQ-P-416 (Cadmium) | Standard Conditions (Dry) | 46/100 |
| | 2 days @ 140° F. in AMS2629 (JRF) | 31/100 |
| | 2 days @ 140° F. in 3% NaCl Water | 38/100 |
| | 2 days @ 140° F. in MIL-PRF-83282 | 36/100 |
| | 2 days @ 140° F. in MIL-PRF-7808 | 37/100 |
| | 2 days @ 140° F. in MIL-PRF-23699 | 35/100 |
| AMS4376, AMS-M-3171 (Alodine Magnesium) | Standard Conditions (Dry) | 23/100 |
| | 2 days @ 140° F. in AMS2629 (JRF) | 21/100 |
| | 2 days @ 140° F. in 3% NaCl Water | 23/100 |
| | 2 days @ 140° F. in MIL-PRF-83282 | 29/100 |
| | 2 days @ 140° F. in MIL-PRF-7808 | 27/100 |
| | 2 days @ 140° F. in MIL-PRF-23699 | 20/100 |
| AMS4911 (Titanium) | Standard Conditions (Dry) | 25/100 |
| | 2 days @ 140° F. in AMS2629 (JRF) | 30/100 |
| | 2 days @ 140° F. in 3% NaCl Water | 36/100 |
| | 2 days @ 140° F. in MIL-PRF-83282 | 28/100 |
| | 2 days @ 140° F. in MIL-PRF-7808 | 28/100 |
| | 2 days @ 140° F. in MIL-PRF-23699 | 28/100 |
| MIL-PRF-23377 | Standard Conditions (Dry) | 37/100 |
| | 2 days @ 140° F. in AMS2629 (JRF) | 21/100 |
| | 2 days @ 140° F. in 3% NaCl Water | 35/100 |
| | 2 days @ 140° F. in MIL-PRF-83282 | 29/100 |
| | 2 days @ 140° F. in MIL-PRF-7808 | 37/100 |
| | 2 days @ 140° F. in MIL-PRF-23699 | 30/100 |
| AS4/3501-6 (Composite) | Standard Conditions (Dry) | 24/100 |
| | 2 days @ 140° F. in AMS2629 (JRF) | 31/100 |
| | 2 days @ 140° F. in 3% NaCl Water | 43/100 |

Example 3

Class B Sealant

The sealant of Example 3 is a Class B sealant suitable for sealing fillets. The sealant of Example 3 consisted of two parts, an accelerator (referred as Part A) and a base (referred as Part B). The accelerator formulation is shown in Table 3A.

TABLE 3A

Accelerator Formulation.

| Material | Parts (gm) |
|---|---|
| Epon ® Resin 828 | 32.45 |
| Epoxy Novolac DEN ® 431 Epoxy | 13.91 |
| Hydrogenated Terphenyl (HB-40 ®) | 11.13 |
| Carbon Black | 0.23 |
| Zinc Borate | 1.76 |
| Precipitated Calcium Carbonate | 34.12 |
| Coated Calcium Carbonate | 4.64 |
| 2-Benzothiazolythiobutanedioic acid | 1.21 |
| Silane Intermediate, T-1601* | 0.37 |
| Carbamate Intermediate, T-5143* | 0.19 |

*Available from PRC-DeSoto International, Inc., Sylmar, CA.

The accelerator formulation was prepared as described in Example 1.

The base formulation (Part B) is shown in Table 3B.

TABLE 3B

Part B Formulation.

| Material | Parts (gm) |
|---|---|
| Thiol-terminated Polythioether Prepolymer** | 59.65 |
| Cooked Phenolics Resin, T-3921*** | 0.20 |
| Cooked Phenolics Resin, T-3920*** | 0.54 |
| Methylon ® 75108 Resin | 0.81 |
| Precipitated Silica | 0.50 |
| Fumed Silica | 0.50 |
| Hydrated Alumina | 3.88 |
| Titanium Dioxide | 0.32 |
| Zinc Orthophosphate | 4.57 |
| Coated Calcium Carbonate | 20.99 |
| Sodium Titanate | 2.60 |
| Hydrogenated Terphenyl (HB-40 ®) | 2.00 |
| Tricalcium Phosphate | 0.43 |
| Expancel ® 920 DET 40 d25 | 0.73 |
| Tetra n-butyl titanate (TNBT) | 0.27 |
| DABCO ® 33-LV | 0.47 |
| 3-aminopropyltriethoxysilane | 0.80 |
| Tung Oil | 0.74 |

**A thiol-terminated prepolymer, available from PRC-DeSoto International, Inc., Sylmar, CA.
***Phenolics adhesion promoter, available from PRC-DeSoto International, Inc., Sylmar, CA.

Part B was prepared by the following method. In a 300 XL FlackTek Hauschild cup, the polythioether prepolymer, T-3920, T-3921, and Methylon® 75108 were added. Using a Hauschild Speedmixer 1100.1 VAC-P (for all mixing steps), the composition was mixed for 3 min at 1,500 rpm under a 100% vacuum. Precipitated silica and fumed silica were added and the composition mixed for 1 min at 1,500 rpm, followed by 2 min at 1,000 rpm under a 100% vacuum. The sides of the cups were scraped and added to the composition. Hydrated alumina, titanium dioxide, zinc orthophosphate, and coated calcium carbonate were then added and the composition mixed for 1 min at 1,500 rpm, followed by 2 min at 1,000 rpm under a 100% vacuum. Using a spatula, material was scraped from the sides of cup, added to the composition, and mixed again. Sodium titanate, HB-40®, and tricalcium phosphate were added and the composition mixed for 2 min at 1,200 rpm under a 100% vacuum. The material was allowed to cool to room temperature.

Expancel® was added to the cooled composition and mixed for 1 min at 1,000 rpm, followed by 2 min at 1,200 rpm. Tetra n-butyl titanate was added and immediately hand-mixed thoroughly with a spatula, and then mixed for 1 min at 1,200 rpm. DABCO® 33-LV was added and immediately hand-mixed thoroughly with a spatula and then mixed for 1 min at 1,200 rpm. Tung oil was added and the composition mixed for 1 min at 1,200 rpm. Finally, 3-aminopropyltriethoxysilane was added and the composition mixed for 1 min at 1,200 rpm.

The sealant was prepared by combining 18.6 parts of Part A with 100 parts of Part B by weight. The sealant was hand-mixed thoroughly with a spatula until no yellow or black material remained on the sides and bottom of the cup. The sealant was then mixed for 2 min at 1,200 rpm under a 100% vacuum on a FlackTek Hauschild Speedmixer 1100.1 VAC-P. After mixing, test samples were prepared and tested according to MIL-PRF-81733. The results are shown in Tables 3C and 3D. The peel strength requirements for the Class B sealant of Example 3 were 20 pli/100% cohesive failure

TABLE 3C

Example 3 - Peel Strength.

| Substrate | Conditioning | Load (pli)/% Cohesion |
|---|---|---|
| MIL-C-5541 (Alodined Al) | Standard Conditions (Dry) | 39/100 |
| | 2 days @ 140° F. in MIL-PRF-83282 | 42/100 |
| | 2 days @ 140° F. in MIL-PRF-7808 | 41/100 |
| | 2 days @ 140° F. in MIL-PRF-23699 | 42/100 |
| | 2 days @ 140° F. in SW | 31/100 |
| | 2 days @ 140° F. in AMS 2629B (JRF) | 42/100 |
| AMS 2471 (Anodized Al) | Standard Conditions (Dry) | 51/100 |
| | 2 days @ 140° F. in MIL-PRF-83282 | 54/100 |
| | 2 days @ 140° F. in MIL-PRF-7808 | 34/100 |
| | 2 days @ 140° F. in MIL-PRF-23699 | 40/100 |
| | 2 days @ 140° F. in SW | 22/100 |
| | 2 days @ 140° F. in AMS 2629B (JRF) | 21/100 |
| AMS 4130 (Cad Plated Steel per QQ-P-416) | Standard Conditions (Dry) | 34/100 |
| | 2 days @ 140° F. in MIL-PRF-83282 | 49/100 |
| | 2 days @ 140° F. in MIL-PRF-7808 | 60/100 |
| | 2 days @ 140° F. in MIL-PRF-23699 | 31/100 |
| | 2 days @ 140° F. in SW | 32/100 |
| | 2 days @ 140° F. in AMS 2629B (JRF) | 31/100 |
| AMS 4911 (Titanium) | Standard Conditions (Dry) | 55/100 |
| | 2 days @ 140° F. in MIL-PRF-83282 | 46/100 |
| | 2 days @ 140° F. in MIL-PRF-7808 | 38/100 |
| | 2 days @ 140° F. in MIL-PRF-23699 | 39/100 |
| | 2 days @ 140° F. in SW | 47/100 |
| | 2 days @ 140° F. in AMS 2629B (JRF) | 46/100 |
| AMS 4376 (Magnesium) | Standard Conditions (Dry) | 44/100 |
| | 2 days @ 140° F. in MIL-PRF-83282 | 58/100 |
| | 2 days @ 140° F. in MIL-PRF-7808 | 50/100 |
| | 2 days @ 140° F. in MIL-PRF-23699 | 57/100 |
| | 2 days @ 140° F. in SW | 20/100 |
| | 2 days @ 140° F. in AMS 2629B (JRF) | 38/100 |
| MIL-PRF-23377 (cured 7 days @ std. cond.) (Epoxy Primer) | Standard Conditions (Dry) | 56/100 |
| | 2 days @ 140° F. in MIL-PRF-83282 | 48/100 |
| | 2 days @ 140° F. in MIL-PRF-7808 | 46/100 |
| | 2 days @ 140° F. in MIL-PRF-23699 | 44/100 |
| | 2 days @ 140° F. in SW | 53/100 |
| | 2 days @ 140° F. in AMS 2629B (JRF) | 42/100 |
| AS4/3501-6 (Graphite/Epoxy) (Peel Side) | Standard Conditions (Dry) | 39/100 |
| | 2 days @ 140° F. in MIL-PRF-83282 | 25/100 |
| | 2 days @ 140° F. in MIL-PRF-7808 | 46/100 |
| | 2 days @ 140° F. in MIL-PRF-23699 | 39/100 |
| | 2 days @ 140° F. in SW | 50/100 |
| | 2 days @ 140° F. in AMS 2629B (JRF) | 27/100 |
| AS4/3501-6 (Graphite/Epoxy) (Tool Side) | Standard Conditions (Dry) | 37/100 |
| | 2 days @ 140° F. in MIL-PRF-83282 | 37/100 |
| | 2 days @ 140° F. in MIL-PRF-7808 | 33/100 |
| | 2 days @ 140° F. in MIL-PRF-23699 | 36/100 |
| | 2 days @ 140° F. in SW | 38/100 |
| | 2 days @ 140° F. in AMS 2629B (JRF) | 24/100 |

TABLE 3D

Example 3 - Peel Strength.

| Specimen Type | Conditioning | Test Result |
|---|---|---|
| MIL-C-5541 (Aluminum)/AAMS 4911 (Titanium) Couple | 4 weeks salt/SO$_2$ spray | Pass* |
| MIL-C-5541 (Aluminum)/AAMS 4376 (Magnesium) Couple | 4 weeks salt/SO$_2$ spray | Pass* |

Corrosion resistance was determined according to Galvanic Cell Method T-23, MIL-PRF-81733D, and MM-1076. An aqueous 3% sodium chloride solution was used as the immersion media for the galvanic cell immersion testing. The panel substrates used were bare aluminum (AMS-4045), stainless steel (AMS-5516), titanium composition C (AMS-4911), and cadmium plated steel (QQ-P-416). All test panels were cured in a temperature and humidity controlled room at standard conditions per MM-1076 (8.1.2) for 14 days per MM-1076 (8.1.6).

Un-abraded bare aluminum panels were cleaned with TURCO (L-628) soaked gauze sponges with no additional adhesion promoter applied. Each AMS-4045 bare aluminum panel was taped with ½" 3M 2307 masking tape to a depth of 0.025" in an alternating bare surface/taped pattern. After each panel was taped to the appropriate sealant pattern, sealant was applied to each panel and leveled to the height of the masking tape. Samples underwent a room temperature cured or 2 weeks in a temperature and humidity controlled room. After two weeks of standard curing, panels were paired with a dissimilar metal (stainless steel, titanium, or cadmium) and introduced into an aqueous sodium chloride solution (3%) for two weeks. Regular deionized water was added to the cells 1 week into testing to the original water level.

After the galvanic cells had completed 2 weeks conditioning, the dissimilar metals were removed. The samples were rinsed under hot water to remove any residual salt deposits. Samples were wiped with dry gauze sponges and allowed to fully air dry. Certain sealant regions of each panel were scrapped off using a flat edge razor and ranked for adhesion loss (scored 1-5, with a score of 5 indicating no adhesion loss present). Finally, each sample was analyzed and ranked for corrosion/pitting (scored 1-5, with a score of 5 indicating no corrosion/pitting present) in both sealant and passivation regions of the panels. Samples were assessed under a Bausch and Lomb microscope (1-7× magnification).

The results of galvanic cell adhesion/corrosion analysis in sealant regions are presented in Tables 3E-3F and for galvanic cell corrosion analysis in passivation regions are presented in Tables 3G-3I. The adhesion and corrosion of the sealant of Example 3 and P/S-870 B2, a Class B corrosion inhibitive sealant available from PPG Aerospace are compared. The P/S-870 B@ sealant is a two-part manganese dioxide cured polysulfide formulation containing 4 wt % soluble chromate.

TABLE 3E

Galvanic cell adhesion/corrosion (aluminum/stainless steel) analysis in sealant regions.

| | Stainless Steel | | | |
|---|---|---|---|---|
| Sealant | Sealant Region 3 | Sealant Region 4 | Sealant Region 5 | Total Score |
| Example 3 | 4/5 | 4/4 | 4/4 | 12/13 |
| Chromate-Containing Sealant | 3/3 | 3/4 | 1/3 | 7/10 |

TABLE 3D

Galvanic cell adhesion/corrosion (aluminum/titanium) analysis in sealant regions.

| | Titanium | | | |
|---|---|---|---|---|
| Sealant | Sealant Region 3 | Sealant Region 4 | Sealant Region 5 | Total Score |
| Example 3 | 5/5 | 4/4 | 3/3 | 12/12 |
| Chromate-Containing Sealant | 4/4 | 5/5 | 1/1 | 10/11 |

TABLE 3F

Galvanic cell adhesion/corrosion (aluminum/cadmium) analysis in sealant regions.

| Sealant | Cadmium | | | Total Score |
| --- | --- | --- | --- | --- |
| | Sealant Region 3 | Sealant Region 4 | Sealant Region 5 | |
| Example 3 | 5/5 | 5 | 5/5 | 15/15 |
| Chromate-Containing Sealant | 4/5 | 5/5 | 5/5 | 14/15 |

TABLE 3G

Galvanic cell corrosion (aluminum/stainless steel) analysis in passivation regions.

| Sealant | Stainless Steel | | | | | Total Score |
| --- | --- | --- | --- | --- | --- | --- |
| | Region 1 | Region 2 | Region 3 | Region 4 | Region 5 | |
| Example 3 | 5 | 5 | 5 | 5 | 5 | 25 |
| Chromate-Containing Sealant | 5 | 5 | 5 | 5 | 4 | 24 |

TABLE 3H

Galvanic cell corrosion (aluminum/titanium) analysis in passivation regions.

| Sealant | Titanium | | | | | Total Score |
| --- | --- | --- | --- | --- | --- | --- |
| | Region 1 | Region 2 | Region 3 | Region 4 | Region 5 | |
| Example 3 | 5 | 5 | 5 | 5 | 5 | 25 |
| Chromate-Containing Sealant | 5 | 5 | 5 | 5 | 5 | 25 |

TABLE 3I

Galvanic cell corrosion (aluminum/cadmium) analysis in passivation regions.

| Sealant | Cadmium | | | | | Total Score |
| --- | --- | --- | --- | --- | --- | --- |
| | Region 1 | Region 2 | Region 3 | Region 4 | Region 5 | |
| Example 3 | 5 | 5 | 5 | 5 | 5 | 25 |
| Chromate-Containing Sealant | 5 | 5 | 5 | 5 | 5 | 25 |

The results presented in Tables 3E-3I demonstrate that non-chromate corrosion inhibiting packages provided by the present disclosure provide corrosion protection at least as good as or better than a chromate-containing corrosion inhibiting package.

Example 4

Class C Sealant

The sealant of Example 4 is a Class C sealant suitable for use in fay surface seal applications. The sealant of Example 4 consists of two parts, an accelerator (referred as Part A) and a base (referred as Part B). The accelerator formulation is shown in Table 4A.

TABLE 4A

Accelerator Formulation.

| Material | Parts (gm) |
| --- | --- |
| Epon ® Resin 828 | 26.14 |
| Epoxy Novolac DEN ® 431 Epoxy | 17.43 |
| Hydrogenated Terphenyl (HB-40 ®) | 10.80 |
| Carbon Black | 0.21 |
| Zinc Borate | 1.71 |
| Precipitated Calcium Carbonate | 35.82 |
| Coated Calcium Carbonate | 4.87 |
| 2-Benzothiazolythiobutanedioic acid | 1.22 |
| Silane Intermediate, T-1601* | 1.80 |

*Available from PRC-DeSoto International, Inc., Sylmar, CA.

Part A was prepared using the process described in Example 1.

The base formulation (Part B) is shown in Table 4B.

TABLE 4B

Part B Formulation.

| Material | Parts (gm) |
| --- | --- |
| Thiol-terminated Polythioether Prepolymer** | 60.00 |
| Cooked Phenolics Resin, T-3921*** | 0.57 |
| Cooked Phenolics Resin, T-3920*** | 0.25 |
| Methylon ® 75108 Resin | 0.85 |
| Precipitated Calcium Carbonate | 12.98 |
| Coated Calcium Carbonate | 12.98 |
| Hydrated Alumina | 3.92 |
| Zinc Orthophosphate | 3.00 |
| Sodium Titanate | 2.60 |
| Hydrogenated Terphenyl (HB-40) | 2.00 |
| Tricalcium Phosphate | 0.43 |
| Tetra n-butyl titanate (TNBT) | 0.27 |
| 2,4,6-Tri(dimethylaminomethyl)phenol | 0.20 |
| 3-Aminopropyltriethoxysilane | 0.42 |

**A thiol-terminated prepolymer, available from PRC-DeSoto International, Inc., Sylmar, CA.
***Phenolics adhesion promoter, available from PRC-DeSoto International, Inc., Sylmar, CA.

Part B was prepared using the following process. In a 300 XL FlackTek Hauschild cup, polythioether prepolymer, T-3920, T-3921, and Methylon® 75108 were added. Using a Hauschild Speedmixer 1100.1 VAC-P (for all mixing steps), the composition was mixed for 3 min at 1,500 rpm under vacuum. Precipitated calcium carbonate and coated calcium carbonate were added and the composition mixed for 1 min at 1,500 rpm, followed by 2 min at 1,000 rpm under vacuum. Hydrated alumina and zinc orthophosphate were then added, mixed for 1 min at 1,500 rpm, followed by 2 min at 1,000 rpm under vacuum. Using a spatula, the sides of the cup were scraped, the unmixed dry material added to the composition, and the mixing process was repeated. Sodium titanate, HB-40® and tricalcium phosphate were then added and the composition mixed for 2 min at 1,200 rpm under vacuum. The material was allowed to cool to room temperature.

Tetra n-butyl titanate was added to the cooled material, immediately hand-mix thoroughly with a spatula and then mixed for 1 min at 1,500 rpm. 2,4,6-Tri(dimethylaminomethyl)phenol was added and the composition mixed for 1 min at 1,200 rpm. Finally, 3-aminopropyltriethoxysilane was added and the composition mixed for 1 min at 1,200 rpm.

The sealant was prepared by combining 19.7 parts of Part A material with 100 parts of Part B material by weight. In a 300 XL FlackTek Hauschild cup, the material was hand-mix thoroughly with a spatula until no yellow or black material remained on the sides and bottom of the cup. The sealant was then mixed for 2 min at 1,200 rpm under vacuum on a FlackTek Hauschild Speedmixer 1100.1 VAC-P. After mixing, test samples were prepared and tested according to MIL-PRF-81733. The results are shown in Tables 4C-4H. The peel strength requirements for the Class B sealant of Example 4 were 20 pli/100% cohesive failure. The lap shear strength requirements for the sealant of Example 4 were 200 pli/100% cohesive failure.

TABLE 4C

Example 4 - Peel Strength.

| Substrate | Conditioning | pli/% cohesive failure |
|---|---|---|
| MIL-C-81706 (Alodine) | Standard Conditions (Dry) | 49/100 |
| | 2 days @ 140° F. in AMS2629 (JRF) | 34/100 |
| | 2 days @ 140° F. in 3% NaCl Water | 52/100 |
| | 2 days @ 140° F. in MIL-PRF-83282 | 79/100 |
| | 2 days @ 140° F. in MIL-PRF-7808 | 91/100 |
| | 2 days @ 140° F. in MIL-PRF-23699 | 82/100 |
| MIL-A-8625 (SAA) | Standard Conditions (Dry) | 62/100 |
| | 2 days @ 140° F. in AMS2629 (JRF) | 34/100 |
| | 2 days @ 140° F. in 3% NaCl Water | 61/100 |
| | 2 days @ 140° F. in MIL-PRF-83282 | 82/100 |
| | 2 days @ 140° F. in MIL-PRF-7808 | 64/100 |
| | 2 days @ 140° F. in MIL-PRF-23699 | 75/100 |

TABLE 4D

Example 4 - Peel Strength.

| Substrate | Conditioning/Requirements | pli/% cohesive failure |
|---|---|---|
| AMS-QQ-P-416 (Cadmium) | Standard Conditions (Dry) | 49/100 |
| | 2 days @ 140° F. in AMS2629 (JRF) | 29/100 |
| | 2 days @ 140° F. in 3% NaCl Water | 39/100 |
| | 2 days @ 140° F. in MIL-PRF-83282 | 44/100 |
| | 2 days @ 140° F. in MIL-PRF-7808 | 67/100 |
| | 2 days @ 140° F. in MIL-PRF-23699 | 44/100 |
| AMS4376 AMS-M-3171 (Alodined Magnesium) | Standard Conditions (Dry) | 56/100 |
| | 2 days @ 140° F. in AMS2629 (JRF) | 31/100 |
| | 2 days @ 140° F. in 3% NaCl Water | 74/100 |
| | 2 days @ 140° F. in MIL-PRF-83282 | 71/100 |
| | 2 days @ 140° F. in MIL-PRF-7808 | 85/100 |
| | 2 days @ 140° F. in MIL-PRF-23699 | 89/100 |

TABLE 4E

Example 4 - Peel Strength.

| Substrate | Conditioning/Requirements | pli/% cohesive failure |
|---|---|---|
| AMS4911 (Titanium) | Standard Conditions (Dry) | 61/100 |
| | 2 days @ 140° F. in AMS2629 (JRF) | 37/100 |
| | 2 days @ 140° F. in 3% NaCl Water | 58/100 |
| | 2 days @ 140° F. in MIL-PRF-83282 | 58/100 |
| | 2 days @ 140° F. in MIL-PRF-7808 | 60/100 |
| | 2 days @ 140° F. in MIL-PRF-23699 | 53/100 |
| MIL-PRF-23377 | Standard Conditions (Dry) | 80/100 |
| | 2 days @ 140° F. in AMS2629 (JRF) | 47/100 |
| | 2 days @ 140° F. in 3% NaCl Water | 31/100 |
| | 2 days @ 140° F. in MIL-PRF-83282 | 72/100 |
| | 2 days @ 140° F. in MIL-PRF-7808 | 53/100 |
| | 2 days @ 140° F. in MIL-PRF-23699 | 49/100 |

TABLE 4F

Example 4 - Peel Strength.

| Substrate | Conditioning/Requirements | pli/% cohesive failure |
|---|---|---|
| AS4/3501-6- Peel Side (Composite) | Standard Conditions (Dry) | 54/100 |
| | 2 days @ 140° F. in AMS2629 (JRF) | 36/100 |
| | 2 days @ 140° F. in 3% NaCl Water | 48/100 |
| | 2 days @ 140° F. in MIL-PRF-83282 | 70/100 |
| | 2 days @ 140° F. in MIL-PRF-7808 | 78/100 |
| | 2 days @ 140° F. in MIL-PRF-23699 | 76/100 |

TABLE 4G

Example 4 - Peel Strength.

| Substrate | Conditioning/Requirements | pli/% cohesive failure |
|---|---|---|
| MM1255 per MP24050 | Standard Conditions (Dry) | 67/100 |
| | | 57/100 |
| | 7 days @ 140° F. in 3% NaCl Water | 50/100 |
| | | 51/100 |
| | 7 days @ 140° F. in AMS2629 (JRF) | 25/100 |
| | | 28/100 |
| MM1275 per MP24050 | Standard Conditions (Dry) | 58/100 |
| | | 60/100 |
| | 7 days @ 140° F. in 3% NaCl Water | 49/100 |
| | | 53/100 |
| | 7 days @ 140° F. in AMS2629 (JRF) | 22/100 |
| | | 25/100 |
| MM1275 per MP24050 + M1276 MP24053 | Standard Conditions (Dry) | 48/100 |
| | | 58/100 |
| | 7 days @ 140° F. in 3% NaCl Water | 43/100 |
| | | 51/100 |
| | 7 days @ 140° F. in AMS2629 (JRF) | 26/100 |
| | | 26/100 |

TABLE 4H

Example 4 - Lap Shear Strength.

| Substrate | Conditioning/Requirements | psi/% cohesive failure |
|---|---|---|
| MIL-C-81706 per MIL-DTL-5541 | Standard Conditions (Dry) 200 psi/100% CF | 571/100 |
| | | 571/100 |
| | | 537/100 |
| | | 597/100 |
| | | 572/100 |
| | 7 days @ 140° F. in 3% NaCl Water 200 psi/100% CF | 417/100 |
| | | 463/100 |
| | | 458/100 |
| | | 423/100 |
| | | 401/100 |
| | 7 days @ 140° F. in AMS2629 (JRF) 200 psi/100% CF | 468/100 |
| | | 485/100 |
| | | 388/100 |
| | | 485/100 |
| | | 419/100 |

Example 5

Class C Sealant

The sealant of Example 5 is a Class C sealant suitable for use in fay surface applications. The sealant of Example 5 consists of two parts, the accelerator (referred as Part A) and the base (referred as Part B). The accelerator formulation is shown in Table 5A.

TABLE 5A

Accelerator Formulation.

| Material | Parts (gm) |
| --- | --- |
| Epon ® Resin 828 | 26.14 |
| Epoxy Novolac DEN ® 431 Epoxy | 17.43 |
| Hydrogenated Terphenyl (HB-40 ®) | 10.80 |
| Carbon Black | 0.21 |
| Zinc Borate | 1.71 |
| Precipitated Calcium Carbonate | 35.82 |
| Coated Calcium Carbonate | 4.87 |
| 2-Benzothiazolythiobutanedioic acid | 1.22 |
| Silane Intermediate, T-1601* | 1.80 |

*Available from PRC-DeSoto International, Inc., Sylmar, CA.

Part A was prepared according to the procedure described in Example 1.

The base formulation (Part B) is shown in Table 5B.

TABLE 5B

Part B Formulation.

| Material | Parts (gm) |
| --- | --- |
| Thiol-terminated Polythioether Prepolymer** | 60.00 |
| Cooked Phenolics Resin, T-3921*** | 0.57 |
| Cooked Phenolics Resin, T-3920*** | 0.25 |
| Methylon ® 75108 Resin | 0.85 |
| Precipitated Calcium Carbonate | 10.76 |
| Coated Calcium Carbonate | 10.76 |
| Hydrated Alumina | 3.92 |
| Zinc Orthophosphate | 3.00 |
| Sodium Titanate | 2.60 |
| Hydrogenated Terphenyl (HB-40 ®) | 2.00 |
| Tricalcium Phosphate | 0.43 |
| Molecular Sieve | 4.00 |
| Tyzor tetra n-butyl titanate (TNBT) | 0.27 |
| Imidazole | 0.20 |
| 3-Aminopropyltriethoxysilane | 0.42 |

**A thiol-terminated prepolymer, available from PRC-DeSoto International, Inc., Sylmar, CA.
***Phenolics adhesion promoter, available from PRC-DeSoto International, Inc., Sylmar, CA.

Part B was prepared using the following procedure. Polythioether prepolymer, T-3920, T-3921, and Methylon® 75108 were added to a 300 XL FlackTek Hauschild cup. Using a Hauschild Speedmixer 1100.1 VAC-P (for all mixing steps), the composition was mixed for 3 min at 1,500 rpm under vacuum. Precipitated calcium carbonate and coated calcium carbonate were added and the composition mixed for 1 min at 1,500 rpm, followed by 2 min at 1,000 rpm under vacuum. Hydrated alumina and zinc orthophosphate were added and the composition mixed 1 min at 1,500 rpm, followed by 2 min at 1,000 rpm under vacuum. Using a spatula, the sides of the cup were scraped, the material added to the composition, and the mixing process repeated. Sodium titanate, HB-40® and tricalcium phosphate were added and the composition mixed for 2 min at 1,200 rpm under vacuum. The material was allowed to cool to room temperature.

Molecular sieve was added to the cooled composition and mix 1 min at 1,500 rpm, followed by 2 min at 1,000 rpm under vacuum. Tetra n-butyl titanate was added, immediately hand-mixed thoroughly with a spatula and then mixed for 1 min at 1,500 rpm. Imidazole was added and the composition mixed for 1 min at 1,200 rpm. Finally, 3-aminopropyltriethoxysilane was added and the composition mixed for 1 min at 1,200 rpm.

The sealant was prepared by combining 19.7 parts of Part A material with 100 parts of Part B material by weight in a 300 XL FlackTek Hauschild cup. The sealant was hand-mix thoroughly with a spatula until no yellow or black material remained on the sides and bottom of the cup. The sealant was then mixed 2 min at 1,200 rpm with 100% vacuum on a FlackTek Hauschild Speedmixer 1100.1 VAC-P. After mixing, test samples were prepared and tested according to MIL-PRF-81733, which is incorporated by reference in its entirety The results are shown in Table 5C. The peel strength requirements for the Class C sealant of Example 5 were 20 pli/100% cohesive failure.

TABLE 5C

Example 5 - Properties.

| Test | Conditioning | Test Results | Specification/Requirements |
| --- | --- | --- | --- |
| Non-Volatile Content | Standard Conditions | 99% | ≥97% |
| Viscosity of Base | Standard Conditions | 1,725 poise | 1,000-4,000 poise |
| Application Time | Standard Conditions | 325 g/min @ 48 h | ≥50 g/min @ 48 h |
| Assembly Time | Standard Conditions | 0.004" @ 168 h | ≤0.005" @ 168 h |
| Hardness | Standard Conditions | 62 Shore A | ≥30 Shore A |
| Specific Gravity | Standard Conditions | 1.47 | ≤1.55 |
| Thermal Stability | 48 hours @ 149 ± 2° C. | Pass | No blistering, checking or cracking |

TABLE 5D

Example 5 - Peel Strength.

| Substrate | Conditioning | pli/% cohesive failure |
| --- | --- | --- |
| MIL-C-81706 (Alodine) | 2 days @ 140° F. in AMS2629 (JRF) | 20/100 |
| | 2 days @ 140° F. in 3% NaCl Water | 39/100 |
| | 2 days @ 140° F. in MIL-PRF-83282 | 41/100 |
| | 2 days @ 140° F. in MIL-PRF-7808 | 32/100 |
| | 2 days @ 140° F. in MIL-PRF-23699 | 41/100 |
| MIL-A-8625 (SAA) | Standard Conditions (Dry) | 27/100 |
| | 2 days @ 140° F. in AMS2629 (JRF) | 21/100 |
| | 2 days @ 140° F. in 3% NaCl Water | 43/100 |
| | 2 days @ 140° F. in MIL-PRF-83282 | 41/100 |
| | 2 days @ 140° F. in MIL-PRF-7808 | 49/100 |
| | 2 days @ 140° F. in MIL-PRF-23699 | 45/100 |

TABLE 5E

Example 5 - Peel Strength.

| Substrate | Conditioning | pli/% cohesive failure |
| --- | --- | --- |
| AMS4376 | Standard Conditions (Dry) | 34/100 |
| AMS-M-3171 (Alodined Magnesium) | 2 days @ 140° F. in AMS2629 (JRF) | 20/100 |
| | 2 days @ 140° F. in 3% NaCl Water | 36/100 |
| | 2 days @ 140° F. in MIL-PRF-83282 | 35/100 |
| | 2 days @ 140° F. in MIL-PRF-7808 | 36/100 |
| | 2 days @ 140° F. in MIL-PRF-23699 | 35/100 |
| AMS4911 (Titanium) | Standard Conditions (Dry) | 23/100 |
| | 2 days @ 140° F. in AMS2629 (JRF) | 20/100 |
| | 2 days @ 140° F. in 3% NaCl Water | 34/100 |
| | 2 days @ 140° F. in MIL-PRF-83282 | 43/100 |
| | 2 days @ 140° F. in MIL-PRF-7808 | 33/100 |
| | 2 days @ 140° F. in MIL-PRF-23699 | 37/100 |

TABLE 5F

Example 5 - Peel Strength.

| Substrate | Conditioning | pli/% cohesive failure |
|---|---|---|
| MIL-PRF-23377 | Standard Conditions (Dry) | 36/100 |
| | 2 days @ 140° F. in AMS2629 (JRF) | 20/100 |
| | 2 days @ 140° F. in 3% NaCl Water | 37/100 |
| | 2 days @ 140° F. in MIL-PRF-83282 | 33/100 |
| | 2 days @ 140° F. in MIL-PRF-7808 | 49/100 |
| | 2 days @ 140° F. in MIL-PRF-23699 | 38/100 |

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A composition comprising:
   a thiol-terminated polythioether prepolymer;
   a polyepoxide curing agent; and
   a non-chromate corrosion inhibitor, wherein the non-chromate corrosion inhibitor comprises:
     from 2 wt % to 6 wt % of zinc borate;
     from 1 wt % to 5 wt % of 2-benzothiazolylthiobutanedioic acid;
     from 35 wt % to 70 wt % of zinc orthophosphate;
     from 20 wt % to 50 wt % of sodium titanate; and
     from 3 wt % to 8 wt % of tricalcium phosphate,
   wherein wt % is based on the total weight of the non-chromate corrosion inhibitor.

2. The composition of claim 1, wherein the polyepoxide curing agent comprises an epoxy novolac resin, a bisphenol A/epichlorohydrin epoxy resin, or a combination thereof.

3. The composition of claim 1, wherein the thiol-terminated polythioether prepolymer comprises a backbone having the structure of Formula (1):

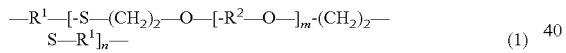

$-R^1-[-S-(CH_2)_2-O-[-R^2-O-]_m-(CH_2)_2-S-R^1]_n-$ (1)

wherein,
   each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, and a $-[(-CHR^3-)_p\text{-}X-]_q\text{-}(CHR^3)_r-$ group, wherein each $R^3$ is selected from hydrogen and methyl;
   each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a $-[(-CH_2-)_p\text{-}X-]_q\text{-}(CH_2)_r-$ group;
   each X is independently selected from O, S, —NH—, and —N(—CH$_3$)—;
   m ranges from 0 to 50;
   n is an integer ranging from 1 to 60;
   p is an integer ranging from 2 to 6;
   q is an integer ranging from 1 to 5; and
   r is an integer ranging from 2 to 10.

4. The composition of claim 1, wherein the thiol-terminated polythioether prepolymer comprises a thiol-terminated polythioether prepolymer of Formula (2a), a thiol-terminated polythioether prepolymer of Formula (2b), or a combination thereof:

$HS-R^1-[-S(CH_2)_2-O-(R^2-O)_m-(CH_2)_2-S-R^1-]_n-SH$ (2a)

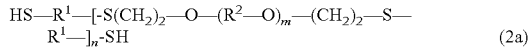

$\{HS-R^1-[-S-(CH_2)_2-O-(R^2-O)_m-(CH_2)_2-S-R^1-]_n-S-V'-\}_zB$ (2b)

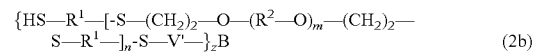

wherein:
   each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(-CHR^3-)_p\text{-}X-]_q\text{-}(-CHR^3-)_r-$, wherein:
     p is an integer from 2 to 6;
     q is an integer from 1 to 5;
     r is an integer from 2 to 10;
     each $R^3$ is independently selected from hydrogen and methyl; and
     each X is independently selected from —O—, —S—, —NH—, and —N(—CH$_3$)—;
   each $R^2$ is independently selected from $C_{1-10}$ alkanediyl, $C_{6-8}$ cycloalkanediyl, $C_{6-14}$ alkanecycloalkanediyl, and $-[(-CHR^3-)_p\text{-}X-]_q\text{-}(-CHR^3-)_r-$, wherein p, q, r, $R^3$, and X are as defined as for $R^1$;
   m is an integer from 0 to 50;
   n is an integer from 1 to 60; and
   B represents a core of a z-valent, vinyl-terminated polyfunctionalizing agent $B(-V)_z$ wherein:
     z is an integer from 3 to 6; and
     each V is a group comprising a terminal vinyl group; and
   each —V'— is derived from the reaction of —V with a thiol.

5. The composition of claim 1, wherein the thiol-terminated polythioether prepolymer comprises the reaction product of reactants comprising:
   (a) a dithiol of Formula (3):

$HS-R^1-SH$ (3)

wherein:
   $R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[-(CHR^3)_p-X-]_q-(CHR^3)_r-$;

wherein:
   each $R^3$ is independently selected from hydrogen and methyl;
   each X is independently selected from —O—, —S—, —NH—, and —N(—CH$_3$)—;
   p is an integer from 2 to 6;
   q is an integer from 1 to 5; and
   r is an integer from 2 to 10; and
(b) a divinyl ether of Formula (4):

$CH_2=CH-O-[-R^2-O-]_m-CH=CH_2$ (4)

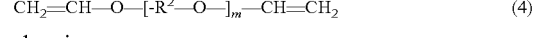

wherein:
   each $R^2$ is independently selected from $C_{1-10}$ alkanediyl, $C_{6-8}$ cycloalkanediyl, $C_{6-14}$ alkanecycloalkanediyl, and $-[(-CHR^3-)_p\text{-}X-]_q\text{-}(-CHR^3-)_r$, wherein p, q, r, $R^3$, and X are as defined for $R^1$; and
   m is an integer from 0 to 50.

6. The composition of claim 5, wherein the reactants comprise (c) a polyfunctional compound $B(-V)_z$, wherein,
   B represents a core of a z-valent, vinyl-terminated polyfunctionalizing agent $B(-V)_z$,
   z is an integer from 3 to 6; and
   each —V is a moiety comprising a terminal vinyl group.

7. The composition of claim 1, wherein the composition comprises:
   from 30 wt % to 65 wt % of the thiol-terminated polythioether prepolymer;

from 3 wt % to 10 wt % of the polyepoxide curing agent; and from 1 wt % to 12 wt % of the non-chromate corrosion inhibitor, where wt % is based on the total weight of the composition.

8. The composition of claim 1, comprising an amine catalyst.

9. The composition of claim 8, wherein the amine catalyst comprises 1,4-diazabicyclo[2.2.2]octane, 2,4,6-tri(dimethylaminomethol)phenol, imidazole, or a combination of any of the foregoing.

10. The composition of claim 1, wherein the composition is formulated as a sealant.

11. A cured sealant prepared from the composition of claim 10.

12. A method of sealing a part comprising:
applying the composition of claim 10, to at least a portion of a part; and
curing the applied composition to provide a sealed part.

13. A cured sealant prepared from the composition of claim 1.

14. A part comprising the cured sealant of claim 13.

15. An aerospace vehicle comprising the cured sealant of claim 13.

16. A composition comprising:
a thiol-terminated polythioether prepolymer;
a polyepoxide curing agent; and
a non-chromate corrosion inhibitor, wherein the non-chromate corrosion inhibitor comprises:
from 0.05 wt % to 0.5 wt % of zinc borate;
from 0.05 wt % to 0.4 wt % of 2-benzothiazolylthiobutanedioic acid;
from 1 wt % to 6 wt % of zinc orthophosphate;
from 0.5 wt % to 5 wt % of sodium titanate; and
from 0.05 wt % to 0.7 wt % of tricalcium phosphate,
where wt % is based on the total weight of the composition.

17. A cured sealant prepared from the composition of claim 16.

18. A part comprising the cured sealant of claim 17.

19. An aerospace vehicle comprising the cured sealant of claim 17.

20. A sealant system, comprising:
a first part comprising:
a thiol-terminated polythioether prepolymer; and
a first portion of a non-chromate corrosion inhibitor, wherein the first portion comprises:
from 1 wt % to 7 wt % of zinc orthophosphate;
from 0.5 wt % to 5 wt % of sodium titanate; and
from 0.1 wt % to 0.7 wt % of tricalcium phosphate,
wherein wt % is based on the total weight of the first part; and
a second part comprising:
a polyepoxide; and
a second portion of a non-chromate corrosion inhibitor, wherein the second portion comprises:
from 0.5 wt % to 3.5 wt % of zinc borate; and
from 0.5 wt % to 3 wt % of 2-benzothiazolylthiobutanedioic acid,
wherein wt % is based on the total weight of the second part.

21. The sealant composition of claim 20, wherein, the first part comprises:
from 40 wt % to 80 wt % of a thiol-terminated polythioether prepolymer;
wherein wt % is based on the total weight of the first part; and
the second part comprises:
from 30 wt % to 60 wt % of a polyepoxide,
wherein wt % is based on the total weight of the second part.

22. A curable sealant composition formed by combining the first part and the second part of the sealant system of claim 20.

23. A cured sealant prepared from the composition of claim 22.

24. A part comprising the cured sealant of claim 23.

25. An aerospace vehicle comprising the cured sealant of claim 23.

26. A non-chromate corrosion inhibitor, comprising:
from 2 wt % to 6 wt % of zinc borate;
from 1 wt % to 5 wt % of 2-benzothiazolylthiobutanedioic acid;
from 35 wt % to 70 wt % of zinc orthophosphate;
from 20 wt % to 50 wt % of sodium titanate; and
from 3 wt % to 8 wt % of tricalcium phosphate,
wherein wt % is based on the total weight of the non-chromate corrosion inhibitor.

27. A composition comprising the non-chromate corrosion inhibitor of claim 26.

28. A cured composition prepared from the composition of claim 27.

29. A part comprising the cured composition of claim 28.

30. An aerospace vehicle comprising the cured composition of claim 28.

31. A cured composition comprising the non-chromate corrosion inhibitor of claim 26.

32. A part comprising the cured composition of claim 31.

33. An aerospace vehicle comprising the cured composition of claim 31.

* * * * *